US012741856B1

(12) United States Patent
Yang et al.

(10) Patent No.: US 12,741,856 B1
(45) Date of Patent: Sep. 22, 2026

(54) MATERIAL HANDLING EQUIPMENT, CONTROL METHOD FOR MATERIAL HANDLING EQUIPMENT, AND CONTROLLER

(71) Applicant: VisionNav Robotics USA Inc., Acworth, GA (US)

(72) Inventors: Siqi Yang, Acworth, GA (US); Bingchuan Yang, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/405,702

(22) Filed: Dec. 2, 2025

(51) Int. Cl.
*G06F 7/00* (2006.01)
*B65G 67/20* (2006.01)
*B66F 9/06* (2006.01)
*B66F 9/075* (2006.01)

(52) U.S. Cl.
CPC ............ *B66F 9/0755* (2013.01); *B65G 67/20* (2013.01); *B66F 9/063* (2013.01)

(58) Field of Classification Search
CPC .... B66F 9/00; B66F 9/06; B66F 9/063; B66F 9/0755; B66F 9/07563; B66F 9/12; B66F 9/122; B66F 9/19; B65G 67/00; B65G 67/02–04; B65G 67/20; B65G 67/24; B65G 67/60; G05B 19/41; G05B 19/4189; G05B 19/41895; B60R 5/00; B60R 5/003; B60R 5/044; B60R 7/08; B60P 1/00; B60P 3/00; G06V 10/44; G06T 1/0007; G06T 2210/56; G06T 2210/61; G06T 2207/10028; G06T 2207/30248
USPC ........................................................ 700/213
See application file for complete search history.

(56) References Cited

U.S. PATENT DOCUMENTS

2021/0090005 A1* 3/2021 Dholakia ............... G06V 20/59
2025/0122057 A1* 4/2025 Nakata .................... B66F 9/063
2026/0001720 A1* 1/2026 Kalouche ............. B65G 1/1376

FOREIGN PATENT DOCUMENTS

CN 114494453 A * 5/2022 ............... G06T 7/13
CN 114265374 B 6/2024
CN 120726120 A * 9/2025 ........... G06V 10/762

* cited by examiner

*Primary Examiner* — Yolanda R Cumbess
(74) *Attorney, Agent, or Firm* — Westbridge IP LLC

(57) ABSTRACT

A material handling equipment includes: a controller, configured to execute program instructions to implement the following steps: acquiring a point cloud of a compartment of a target vehicle; determining, based on the point cloud of the compartment, a first plane located by a left-side wall of the compartment and a second plane located by a right-side wall of the compartment; determining, based on a position of an object inside the compartment, a third plane; determining, based on a position of the third plane, a pose of a storage location or a pose of a cargo; and controlling, based on the pose of the storage location, the material handling equipment to load the target vehicle, or controlling, based on the pose of the cargo, the material handling equipment to unload the target vehicle. Control accuracy of the material handling equipment is increased while improving overall operational efficiency.

18 Claims, 10 Drawing Sheets

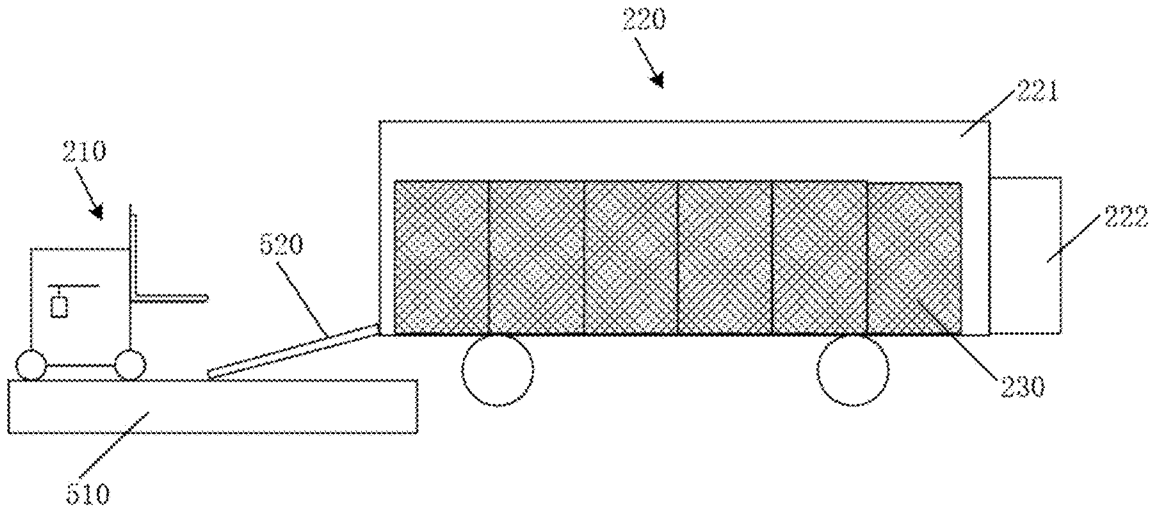

FIG. 5

S410: Acquiring a point cloud of a compartment of a target vehicle

S610: Acquiring a pitch angle of the material handling equipment

S620: Calibrating, based on the pitch angle of the material handling equipment, the point cloud of the compartment S420: Determining, based on the point cloud of the compartment, a first plane located by a left-side wall of the compartment and a second plane located by a right-side wall of the compartment S430: Determining, based on a position of an object inside the compartment, a third plane S460: Determining, based on the position of the third plane, a pose of a cargo S470: Controlling, based on the pose of the cargo, the material handling equipment to unload the target vehicle S440: Determining, based on a position of the third plane, a pose of a storage location S450: Controlling, based on the pose of the storage location, the material handling equipment to load the target vehicle

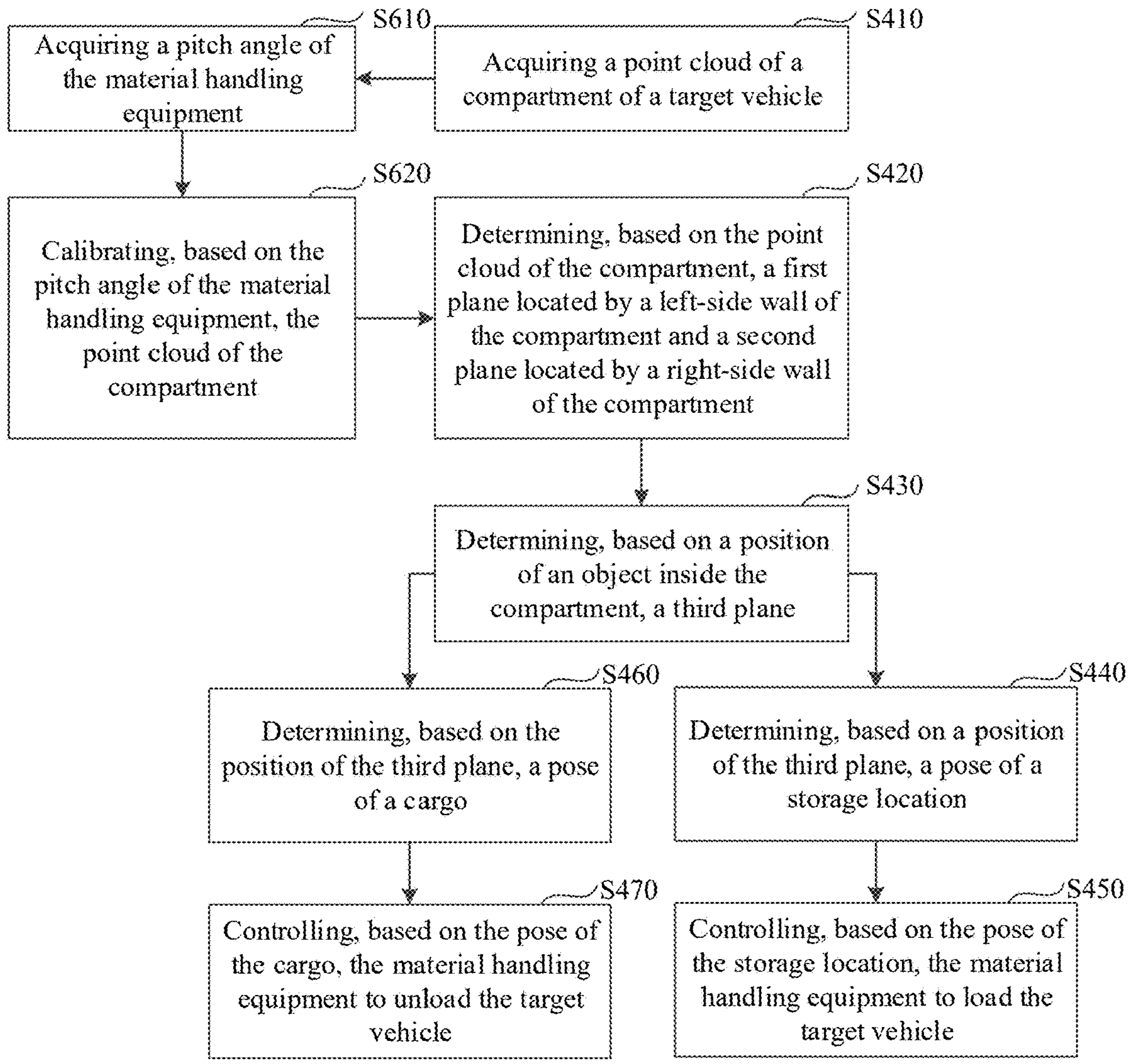

FIG. 6

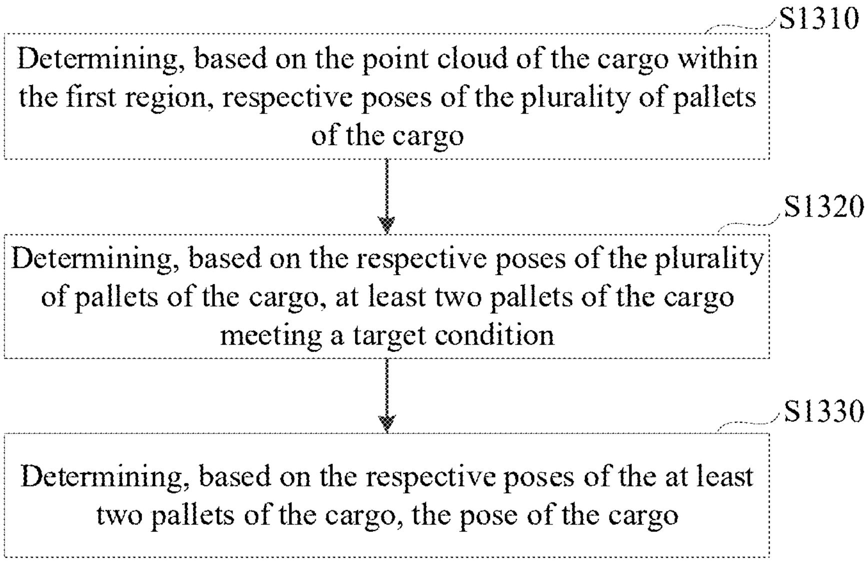

Determining, based on the respective poses of the plurality of pallets of the cargo, an angle difference, a front-to-back difference, a height difference, and a spacing between each adjacent pair of the plurality of pallets of the cargo

S1420

Determining adjacent pairs of pallets of the cargo with the angle difference, the front-to-back difference, the height difference, and the spacing falling within a specified threshold range to be the at least two pallets of the cargo meeting the target condition

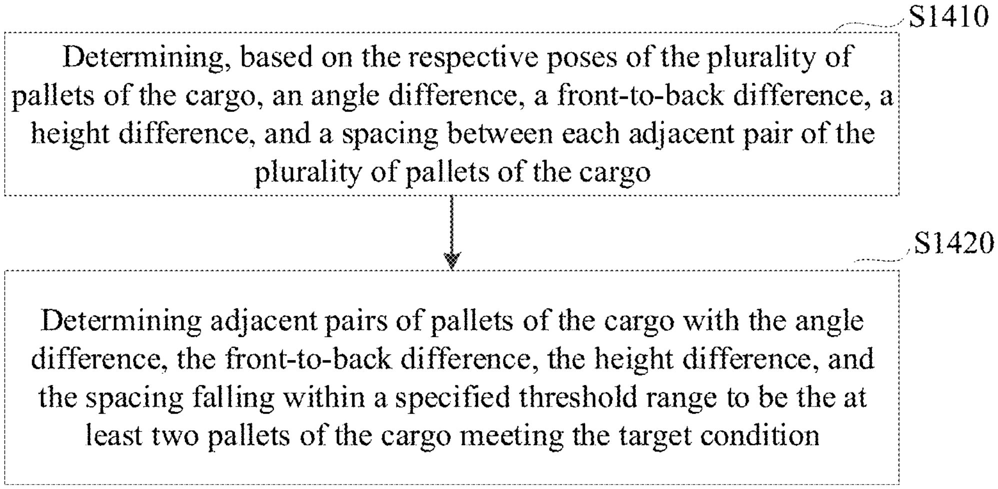

Determining the first region, bounded by the third plane, the first plane and the second plane

S1520

Performing cargo detection on the point cloud within the first region, to obtain the point cloud of the cargo within the first region

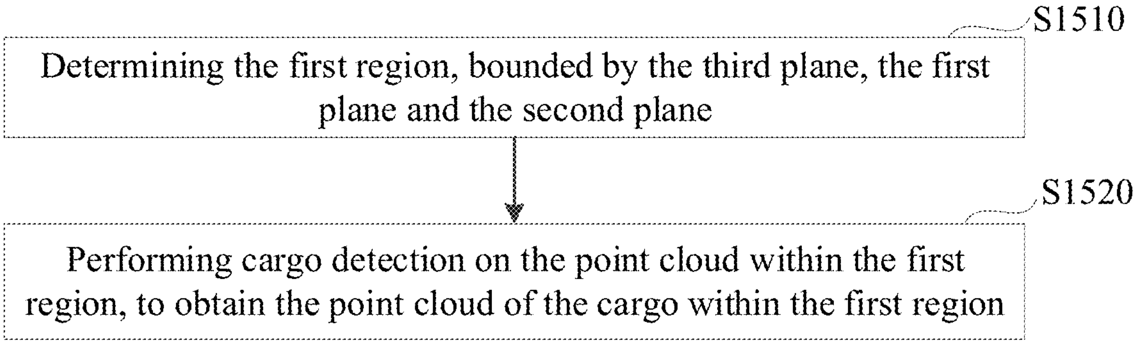

FIG. 15

MATERIAL HANDLING EQUIPMENT, CONTROL METHOD FOR MATERIAL HANDLING EQUIPMENT, AND CONTROLLER

TECHNICAL FIELD

The present disclosure relates to the fields of warehousing, logistics and manufacturing, and in particular, to material handling equipment, a control method for material handling equipment, and a controller.

BACKGROUND

Material handling equipment generally refers to a mechanical apparatus used for moving and/or transporting a cargo. It is one of key facilities for an efficient operation of a logistics supply chain. In recent years, with rapid development of intelligent technology, material handling equipment with automatic or semi-automatic transportation functions has gained increasing attention due to their advantages in improvement in transportation efficiency and safety control. However, control precision of the material handling equipment is not high enough.

SUMMARY

The present disclosure provides material handling equipment, a control method for material handling equipment, and a controller.

In a first aspect, the present disclosure provides the material handling equipment, including: a controller, where the controller is configured to execute program instructions to implement the following steps: acquiring a point cloud of a compartment of a target vehicle; determining, based on the point cloud of the compartment, a first plane located by a left-side wall of the compartment and a second plane located by a right-side wall of the compartment; determining, based on a position of an object inside the compartment, a third plane, where the third plane is perpendicular to the first plane and the second plane; determining, based on a position of the third plane, a pose of a storage location or a pose of a cargo; and controlling, based on the pose of the storage location, the material handling equipment to load the target vehicle, or controlling, based on the pose of the cargo, the material handling equipment to unload the target vehicle.

According to a second aspect, the present disclosure provides a control method for the material handling equipment, including: acquiring a point cloud of a compartment of a target vehicle; determining, based on the point cloud of the compartment, a first plane located by a left-side wall of the compartment and a second plane located by a right-side wall of the compartment; determining, based on a position of an object inside the compartment, a third plane, where the third plane is perpendicular to the first plane and the second plane; determining, based on a position of the third plane, a pose of a storage location or a pose of a cargo; and controlling, based on the pose of the storage location, the material handling equipment to load the target vehicle, or controlling, based on the pose of the cargo, the material handling equipment to unload the target vehicle.

According to a third aspect, the present disclosure provides a controller, configured to execute program instructions to implement the following steps: acquiring a point cloud of a compartment of a target vehicle; determining, based on the point cloud of the compartment, a first plane located by a left-side wall of the compartment and a second plane located by a right-side wall of the compartment; determining, based on a position of an object inside the compartment, a third plane, where the third plane is perpendicular to the first plane and the second plane; determining, based on a position of the third plane, a pose of a storage location or a pose of a cargo; and controlling, based on the pose of the storage location, the material handling equipment to load the target vehicle, or controlling, based on the pose of the cargo, the material handling equipment to unload the target vehicle.

BRIEF DESCRIPTION OF THE DRAWINGS

To more clearly illustrate the technical solutions of the embodiments of the present disclosure or the prior art, a brief description of accompanying drawings that are required in the embodiments will hereinafter be provided. Obviously, the accompanying drawings described below are only some embodiments of the present disclosure. For those skilled in the art, they can obtain other drawings based on these accompanying drawings without creative labor.

FIG. 5 is a schematic diagram of an application scenario of material handling equipment according to still another embodiment of the present disclosure.

FIG. 6 is a schematic flowchart of a control method for material handling equipment according to another embodiment of the present disclosure.

FIG. 13 is a schematic flowchart of determining, based on a point cloud of a cargo within a first region, a pose of the cargo according to some embodiments of the present disclosure.

FIG. 14 is a schematic flowchart of determining, based on respective poses of a plurality of pallets of the cargo, at least two pallets of the cargo meeting a target condition according to some embodiments of the present disclosure.

FIG. 15 is a schematic flowchart of determining, based on a position of a third plane, a first region and acquiring a point cloud of a cargo within the first region, according to some embodiments of the present disclosure.

DETAILED DESCRIPTION OF THE EMBODIMENTS

Figure 1:
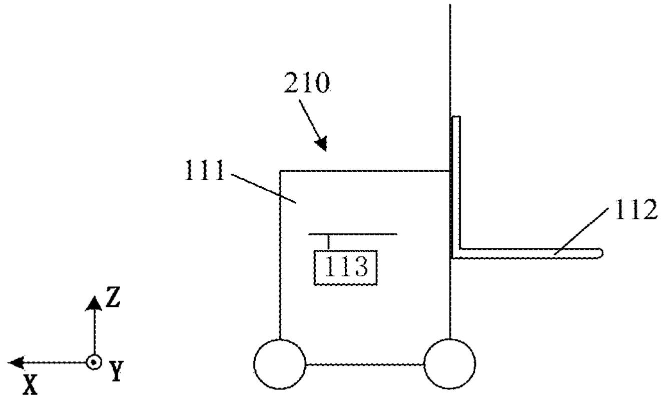
FIG. 1 is a schematic diagram of material handling equipment according to some embodiments of the present disclosure.

A clear and complete description of technical solutions of embodiments of the present disclosure will be given below, with reference to accompanying drawings in the embodiments of the present disclosure. Apparently, the described embodiments are a part rather than all of the embodiments of the present disclosure. All other embodiments obtained by those skilled in the art based on the embodiments of the present disclosure shall fall within the protection scope of the present disclosure.

The terms used in the embodiments of the present disclosure are for the purpose of describing specific embodiments only, and are not intended to limit the present disclosure. The singular forms of "a/an", "the", and "said" used in the embodiments of the present disclosure and the appended claims are also intended to encompass plural forms, unless the context clearly indicates otherwise.

It should be understood that the term "and/or" herein is only used to describe an associative relationship between related objects, indicating that three relationships may exist; for example, "A and/or B" may mean A alone, both A and B, or B alone. The character "/" herein generally indicates an "or" relationship between the objects before and after it. The term "based on" is not limited to relying solely on a particular object; for instance, "determining, based on A, B" may mean determining B solely based on A or partially based on A.

Before introducing the embodiments of the present disclosure, professional terms possibly involved are first defined and explained in the following.

Material handling equipment refers to equipment capable of performing handling tasks automatically or semi-automatically. Common forms of the material handling equipment include: a forklift, an Automated Guided Vehicle (AGV), an Autonomous Mobile Robot (AMR), a humanoid robot, a Robotic Arms (RA), and the like.

An Automated Guided Forklift (AGF) refers to an intelligent industrial vehicle that integrates forklift technology with AGV technology, capable of automatically performing material handling and stacking.

A controller typically includes a processor and memory at a hardware level. Optionally, the controller may further include I/O interfaces, a main board, a peripheral circuit and components. At a software level, the controller generally includes a control algorithm, an operating system, communication protocols, and the like. As used herein, the "controller" may refer to a set of controllers performing the same or different tasks.

A pallet refers to a logistics carrier used to support a cargo, typically composed of one or more beams and a plurality of blocks. The beam is a planar surface located above the blocks. Optionally, an additional beam may be provided beneath the blocks. The blocks are columns positioned below the beam or between two beams. An opening is formed between adjacent blocks for a fork of the material handling equipment to insert, generally called a fork pocket. A side face of the pallet for the fork to insert is called a fork insertion surface, and a portion of the fork insertion surface occupied by a block is called a block face.

A processor configured to perform core functions such as computation, control and decision-making. It receives data from sensors, executes control algorithms and commands actuators to complete tasks. Common types of the processor include a Central Processing Unit (CPU), a Digital Signal Processor (DSP), a Microcontroller Unit (MCU), and the like. As used herein, the "processor" may refer to a set of processors performing the same or different tasks.

A memory is configured to store data, programs, and the like. As used herein, the "memory" may refer to a set of memories performing the same or different tasks.

Controlling the material handling equipment to load a target vehicle refers to controlling the material handling equipment to place a cargo outside a compartment into a designated location (for example, a storage location) within the compartment of the target vehicle. Controlling the material handling equipment to unload the target vehicle refers to controlling the material handling equipment to transport the cargo inside the compartment out of the compartment of the target vehicle. It can be seen that accurate control of the material handling equipment requires precise determination of a pose of the storage location during a loading process and precise determination of a pose of the cargo during an unloading process.

Faced with the above technical problems, embodiments of the present disclosure provide material handling equipment, including: a controller, where the controller is configured to execute program instructions to implement the following steps: acquiring a point cloud of a compartment of a target vehicle; determining, based on the point cloud of the compartment, a first plane located by a left-side wall of the compartment and a second plane located by a right-side wall of the compartment; determining, based on a position of an object inside the compartment, a third plane, where the third plane is perpendicular to the first plane and the second plane; determining, based on a position of the third plane, a pose of a storage location or a pose of a cargo; and controlling, based on the pose of the storage location, the material handling equipment to load the target vehicle, or controlling, based on the pose of the cargo, the material handling equipment to unload the target vehicle.

According to the embodiments of the present disclosure, by utilizing a first plane located by a left-side wall of a compartment, a second plane located by a right-side wall of the compartment, and a third plane, the purpose of determining a pose of a storage location or a pose of a cargo may be achieved. The third plane is determined based on a position of an object inside the compartment, and the third plane is perpendicular to the first plane and the second plane. That is, the embodiments of the present disclosure utilize the first plane, the second plane and the third plane to achieve a purpose of determining the pose of the storage location or the pose of the cargo based on geometric features and key reference planed (that is, the third plane) of the compartment, thereby solving a problem of inaccurate positioning caused by individual differences in the compartments and parking errors during a loading or an unloading process and improving positioning accuracy. Furthermore, a necessary condition for planning an optimal movement path for the material handling equipment is provided, so that control accuracy of the material handling equipment may be enhanced, and exploratory movements, path corrections and even collision risks caused by inaccurate positioning may be avoided, thereby significantly shortening a single loading and unloading cycle time and improving overall operational efficiency. Moreover, as the embodiments of the present disclosure rely mainly on data extracted from the point cloud of the compartment, no large number of additional sensors, calibration fixtures, or similar hardware need to be installed inside the compartment or on a loading dock. Thus, costs are markedly reduced, so that usability and portability may be improved, and a range of applicable scenarios may be significantly broadened.

Firstly, the material handling equipment provided by some embodiments of the present disclosure will be described below with reference to FIG. 1.

FIG. 1 is a schematic diagram of material handling equipment according to some embodiments of the present disclosure. As shown in FIG. 1, the material handling equipment 210 includes a main body of the material handling equipment 111, a handling member 112, and a controller 113. In embodiments of the present disclosure, the material handling equipment 210 may be an automated guided forklift, a pallet truck, a lifting truck, an AGV, an AMR, a humanoid robot, or the like. The handling member 112 may include a fork, a robotic arm, or the like. For example, the controller 113 may be a control mainboard, a control box, a control unit, an on-board computer, a computing platform, a tablet, or any other computing or control system/device mounted on the main body of the material handling equipment 111, or a computing or control system/device embodied in a local server or a cloud server, and may also take other forms such as a hand-held or remote controller, which will not be limited in the embodiments of the present disclosure.

In practical applications, the controller 113 is configured to control the handling member 112 of the material handling equipment 210 to perform operations such as picking up, transporting, and stacking of the pallet 120. For example, the controller 113 is configured to execute a control method for material handling equipment described in the embodiments of the present disclosure. It can be understood that steps included in the control method for the material handling equipment executed by controller 113, as well as the specific contents of each step, may all be adjusted according to actual circumstances.

In some embodiments, the material handling equipment 210 may further include a sensor module (not shown in figures). The sensor module is primarily configured to collect a point cloud of a compartment. The sensor module may include one or more LiDAR or depth cameras, which will not be limited in the embodiments of the present disclosure.

In other embodiments, the material handling equipment 210 may further include a memory (not shown in figures), mainly configured to store data collected by the sensor module, such as point clouds.

An exemplary application scenario of the present disclosure will be described below with reference to FIGS. 2 and 3.

Figure 2:
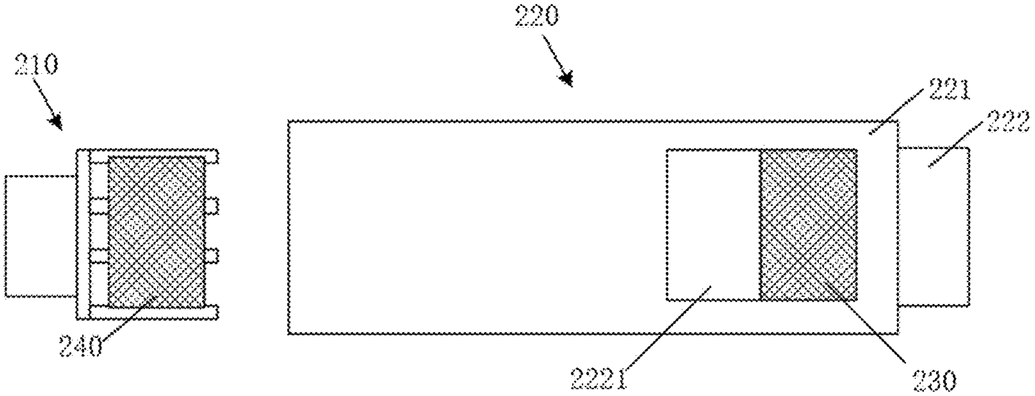
FIG. 2 is a schematic diagram of an application scenario of material handling equipment according to some embodiments of the present disclosure.

FIG. 2 is a schematic diagram of an application scenario of material handling equipment according to some embodiments of the present disclosure. Specifically, the application scenario presented in this embodiment of the present disclosure involves a loading process of the material handling equipment. As shown in FIG. 2, the scenario includes the material handling equipment 210 and a target vehicle 220. The material handling equipment 210 is loaded with a cargo-A 240 and the target vehicle 220 includes a compartment 221 and a front end 222. The compartment 221 is loaded with a cargo-B 230 and provided with a storage location 2221. In practical applications, the material handling equipment 210 needs to be controlled to place the cargo-A 240 onto the storage location 2221. Specifically, a controller of the material handling equipment 210 is configured to execute program instructions to implement the following steps: acquiring a point cloud of the compartment 221 of the target vehicle 220; determining, based on the point cloud of the compartment 221, a first plane located by a left-side wall of the compartment 221 and a second plane located by a right-side wall of the compartment 221; determining, based on a position of an object (for example, the cargo-B 230) inside the compartment 221, a third plane, where the third plane is perpendicular to the first plane and the second plane; determining, based on a position of the third plane, a pose of a storage location 2221; and controlling, based on the pose of the storage location 2221, the material handling equipment 210 to load the target vehicle 220.

Figure 3:
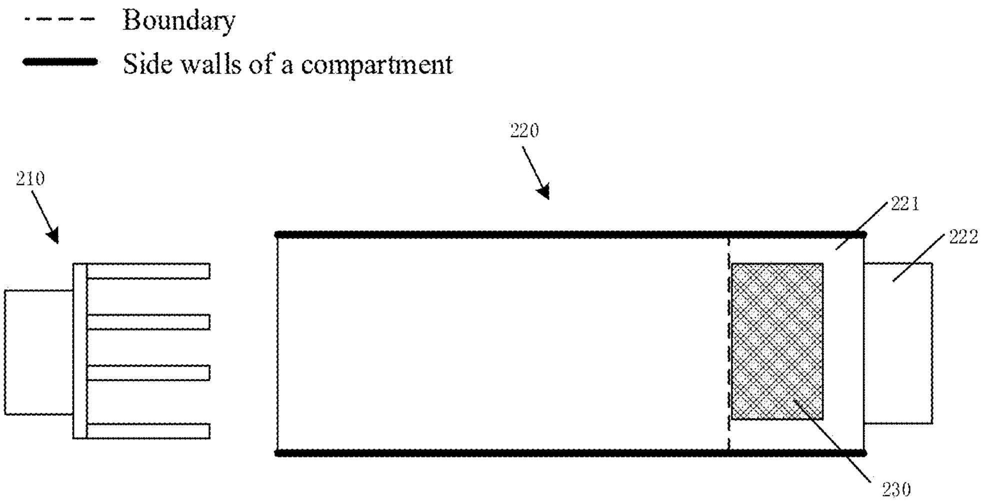
FIG. 3 is a schematic diagram of an application scenario of material handling equipment according to another embodiment of the present disclosure.

FIG. 3 is a schematic diagram of an application scenario of material handling equipment according to another embodiment of the present disclosure. Specifically, the application scenario presented in this embodiment of the present disclosure involves an unloading process of the material handling equipment. As shown in FIG. 3, the scenario includes the material handling equipment 210 and a target vehicle 220. The target vehicle 220 includes a compartment 221 and a front end 222. The compartment 221 is loaded with a cargo-B 230. In practical applications, the material handling equipment 210 needs to be controlled to remove the cargo-B 230 from the compartment 221. Specifically, a controller of the material handling equipment 210 is configured to execute program instructions to implement the following steps: acquiring a point cloud of the compartment 221 of the target vehicle 220; determining, based on the point cloud of the compartment 221, a first plane located by a left-side wall of the compartment 221 and a second plane located by a right-side wall of the compartment 221; determining, based on a position of an object (for example, the cargo-B 230) inside the compartment 221, a third plane, where the third plane is perpendicular to the first plane and the second plane; determining, based on a position of the third plane, a pose of the cargo-B 230; and controlling, based on the pose of the cargo-B 230, the material handling equipment 210 to unload the target vehicle 220. The third plane is determined based on a boundary in FIG. 3, while the first and second planes are determined based on side walls of the compartment in FIG. 3.

Various implementations of a control method for the material handling equipment executed by a controller 113 will be described below with reference to FIGS. 4 to 21.

Figure 4:
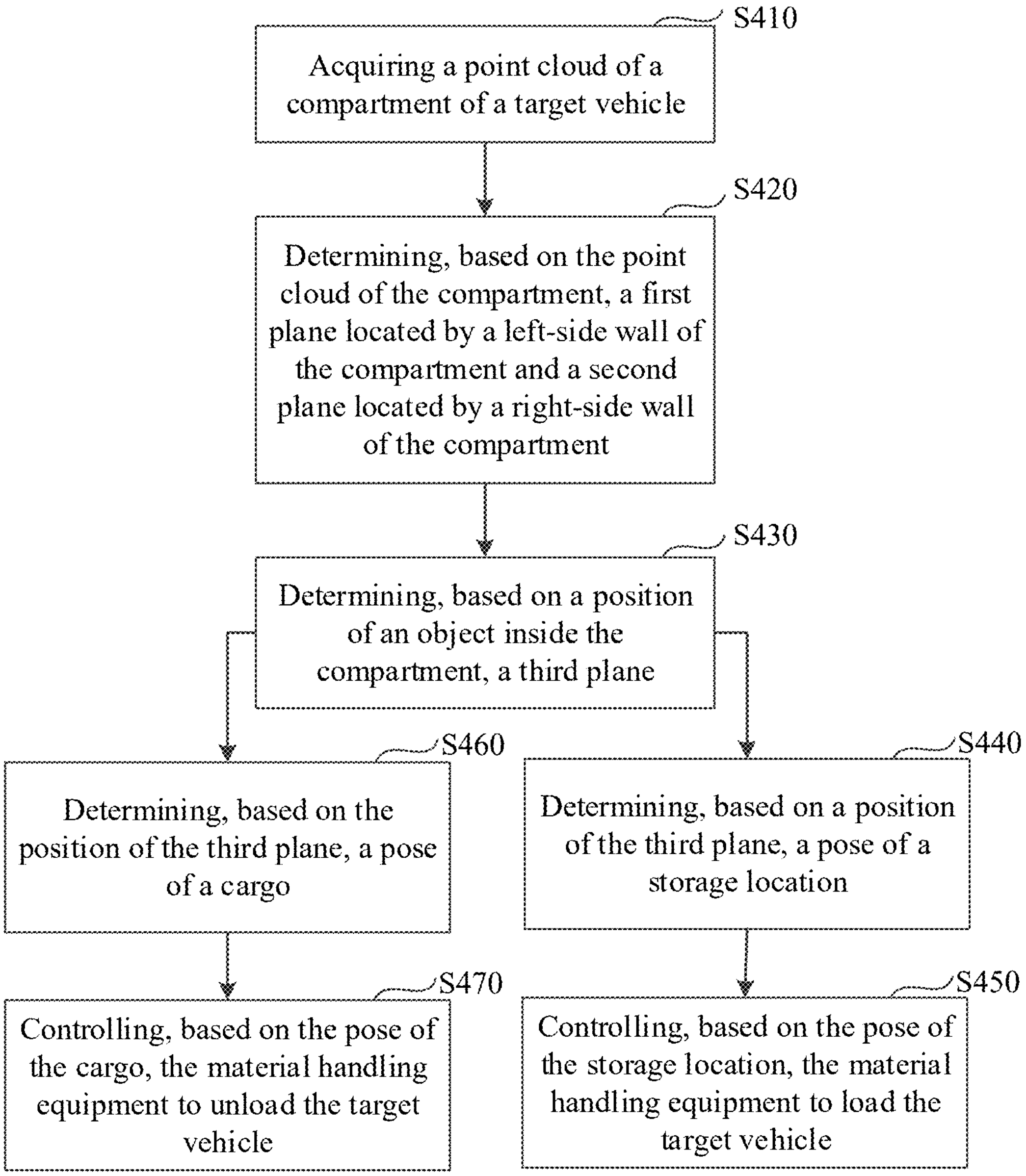
FIG. 4 is a schematic flowchart of a control method for material handling equipment according to some embodiments of the present disclosure.

FIG. 4 is a schematic flowchart of a control method for material handling equipment according to some embodiments of the present disclosure. As shown in FIG. 4, the control method for the material handling equipment according to the embodiments of the present disclosure includes the following steps.

Step S410: acquiring a point cloud of a compartment of a target vehicle.

Exemplarily, the target vehicle is a vehicle that requires loading or unloading.

Step S420: determining, based on the point cloud of the compartment, a first plane located by a left-side wall of the compartment and a second plane located by a right-side wall of the compartment.

Exemplarily, taking a direction from a rear end of the target vehicle toward a front end of the target vehicle as a reference direction, a side wall on the left of the reference direction defined as the left-side wall, and the side wall on the right of the reference direction is defined as the right-side wall. It should be understood that the reference direction may alternatively be defined from the front end of the target vehicle toward the rear end of the target vehicle, which will not be uniformly limited in the embodiments of the present disclosure.

Step S430: determining, based on a position of an object inside the compartment, a third plane.

In some embodiments, the first plane and the second plane are mutually parallel, and the third plane is perpendicular to the first plane and the second plane. The object inside the compartment may be an obstacle or a cargo, which will not be uniformly limited in the embodiments of the present disclosure. If the object is the cargo, a carrier (for example, a pallet or a material cage), or the obstacle, the third plane is determined based on the outermost part of the object. If no object is present inside the compartment, a plane of a front wall of the compartment may instead be determined as the third plane. Because the third plane is determined from the position of the object inside the compartment, spatial layout information about the compartment may be represented by the third plane.

Step S440: determining, based on a position of the third plane, a pose of a storage location.

In a loading scenario, the position of the object mentioned in step S430 may be a position of the cargo and/or a position of the obstacle.

Step S450: controlling, based on the pose of the storage location, the material handling equipment to load the target vehicle.

Step S460: determining, based on the position of the third plane, a pose of a cargo.

In an unloading scenario, the position of the object mentioned in step S430 may be a position of the cargo.

Step S470: controlling, based on the pose of the cargo, the material handling equipment to unload the target vehicle.

That is, for the loading scenario, Steps S410, S420, S430, S440, and S450 are carried out in sequence; for the unloading scenario, Steps S410, S420, S430, S460, and S470 are carried out in sequence.

According to the embodiments of the present disclosure, by utilizing a first plane located by a left-side wall of a compartment, a second plane located by a right-side wall of the compartment, and a third plane, the purpose of determining a pose of a storage location or a pose of a cargo may be achieved. The third plane is determined based on a position of an object inside the compartment, and the third plane is perpendicular to the first plane and the second plane. That is, the embodiments of the present disclosure utilize the first plane, the second plane and the third plane to achieve a purpose of determining the pose of the storage location or the pose of the cargo based on geometric features and key reference planed (that is, the third plane) of the compartment, thereby solving a problem of inaccurate positioning caused by individual differences in the compartments and parking errors during a loading or an unloading process and improving positioning accuracy. Furthermore, a necessary condition for planning an optimal movement path for the material handling equipment is provided, so that control accuracy of the material handling equipment may be enhanced, and exploratory movements, path corrections and even collision risks caused by inaccurate positioning may be avoided, thereby significantly shortening a single loading and unloading cycle time and improving overall operational efficiency. Moreover, as the embodiments of the present disclosure rely mainly on data extracted from the point cloud of the compartment, no large number of additional sensors, calibration fixtures, or similar hardware need to be installed inside the compartment or on a loading dock. Thus, costs are markedly reduced, so that usability and portability may be improved, and a range of applicable scenarios may be significantly broadened.

Owing to factors of vehicle types, ground conditions, and the like, a large height difference and gap may exist between the target vehicle and a warehouse dock. Thus, it is usually necessary to use a dock leveler (also known as a loading platform or a height adjustment plate) to reduce or even eliminate the height difference and the gap. Referring to FIG. 5, FIG. 5 is a schematic diagram of an application scenario of material handling equipment according to still another embodiment of the present disclosure. As shown in FIG. 5, the scenario includes the material handling equipment 210 and a target vehicle 220. The target vehicle 220 includes a compartment 221 and a front end 222, and the compartment 221 is loaded with a cargo-B 230. Furthermore, the scenario further includes a dock 510 and a dock leveler 520. The material handling equipment 210 is located on the dock 510, and the dock leveler 520 is placed between the dock and an entrance of the compartment 221, allowing the material handling equipment 210 to enter and exit the compartment 221 via the dock leveler 520.

Examples will be provided with reference to FIGS. 6 and 7 to illustrate a specific control method for the material handling equipment in an application scenario equipped with the dock leveler in the following.

FIG. 6 is a schematic flowchart of a control method for material handling equipment according to another embodiment of the present disclosure. The embodiment shown in FIG. 6 is extended based on the embodiment shown in FIG. 4. In the following, a difference between the embodiment shown in FIG. 6 and the embodiment shown in FIG. 4 will be described in detail and the same features will not be repeated herein again. In this embodiment of the present disclosure, the material handling equipment further includes a vehicle-state detection device configured to detect a pitch angle of the material handling equipment. The vehicle-state detection device may include at least one of an inertial measurement unit, a gyroscope, a tilt sensor, or a height sensor.

As shown in FIG. 6, this embodiment of the present disclosure further includes the following steps after the acquiring the point cloud of the compartment of the target vehicle (Step S410).

Step S610: acquiring a pitch angle of the material handling equipment.

For example, the pitch angle of the material handling equipment refers to an inclination angle of the material handling equipment in a front-back direction. Taking a coordinate system shown in FIG. 1 as the reference coordinate system, the pitch angle is an angle of rotation around the Y-axis. A positive value indicates that the front end of the material handling equipment is lifted upwards (such as climbing a slope), and a negative value indicates that the front end of the material handling equipment is tilted downwards (such as going declivity).

Step S620: calibrating, based on the pitch angle of the material handling equipment, the point cloud of the compartment.

For example, in practical applications, the point cloud of the compartment of the target vehicle is first acquired; then, the pitch angle of the material handling equipment is acquired. The point cloud of the compartment is calibrated based on the pitch angle of the material handling equipment. Finally, a first plane located by a left-side wall of the compartment and a second plane located by the right-side wall of the compartment are determined based on the point cloud of the compartment.

Because the pitch angle of the material handling equipment directly affects a scanning pose of sensors such as LiDAR, the point cloud of the compartment is calibrated based on the pitch angle of the material handling equipment in the embodiments of the present disclosure, thereby effectively reducing computational error and further improving accuracy of the first plane and the second plane subsequently determined.

An example will be provided below with reference to FIG. 7 to illustrate how to calibrate, based on the pitch angle of the material handling equipment, the point cloud of the compartment.

Figure 7:
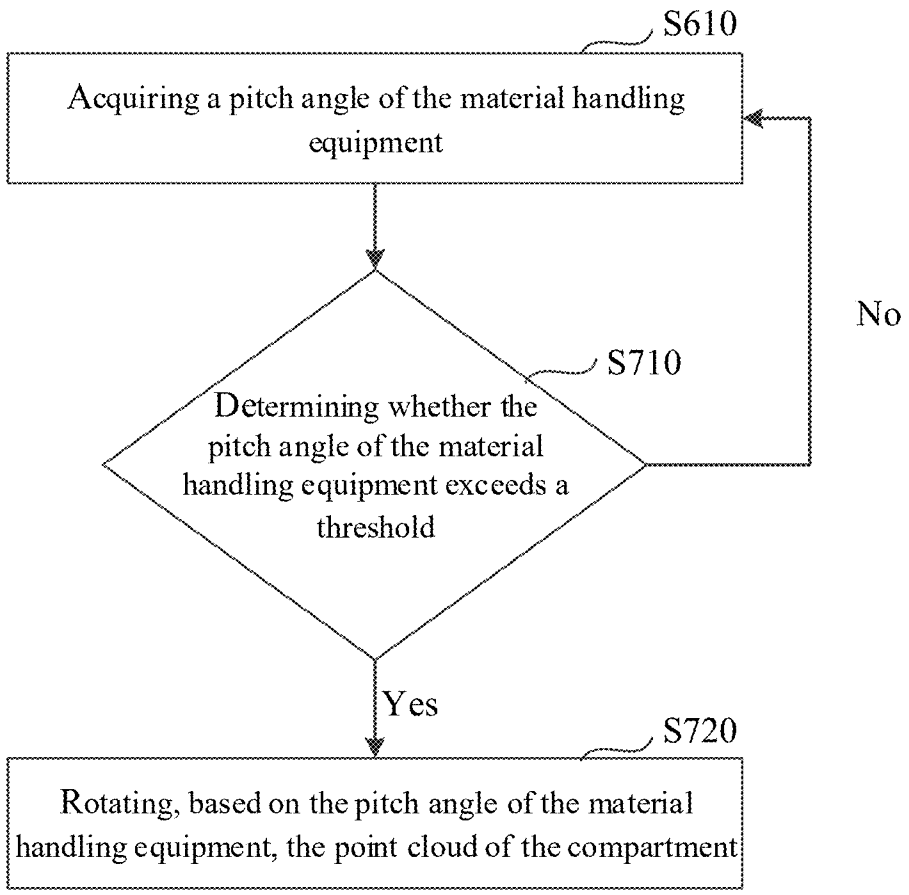
FIG. 7 is a schematic flowchart of calibrating, based on a pitch angle of material handling equipment, a point cloud of a compartment, according to some embodiments of the present disclosure.

FIG. 7 is a schematic flowchart of calibrating, based on a pitch angle of material handling equipment, a point cloud of a compartment, according to some embodiments of the present disclosure. The embodiment shown in FIG. 7 is extended based on the embodiment shown in FIG. 6. In the following, a difference between the embodiment shown in FIG. 7 and the embodiment shown in FIG. 6 will be described in detail and the same features will not be repeated herein again.

As shown in FIG. 7, in the embodiment of the present disclosure, the step of calibrating, based on the pitch angle of the material handling equipment, the point cloud of the compartment includes the following steps.

Step S710: determining whether the pitch angle of the material handling equipment exceeds a threshold.

The threshold may be determined based on an actual model of the material handling equipment. For example, the threshold may be set +10 degrees, +20 degrees, −10 degrees, or −20 degrees, etc., which will not be uniformly limited in the embodiments of the present disclosure. Additionally, in some embodiments, the threshold is dynamically adjustable.

Step 720: rotating, based on the pitch angle of the material handling equipment, the point cloud of the compartment.

Exemplarily, in practical applications, after the pitch angle of the material handling equipment is obtained, it is determined whether the angle exceeds the threshold. If the pitch angle of the material handling equipment exceeds the threshold, then the point cloud of the compartment is rotated based on the pitch angle of the material handling equipment; if the pitch angle of the material handling equipment does not exceed the threshold, then the pitch angle of the material handling equipment is continuously acquired to determine whether the new pitch angle exceeds the threshold.

According to the embodiment of the present disclosure, by using a threshold, the calibration process will be performed only when accuracy is significantly affected by the pitch angle accuracy, so that unnecessary calibration caused by minor angle fluctuations may be prevented, thereby avoiding mis-calibration due to instantaneous vibrations (such as road bumps), and improving anti-interference capability.

Generally, a method of increasing a quantity of LiDAR may be used to ensure completeness of the collected point cloud. However, this method not only raises hardware cost but also increases a computational load.

An example of how to ensure the completeness of the collected point cloud is described below with reference to FIG. 8.

Figure 8:
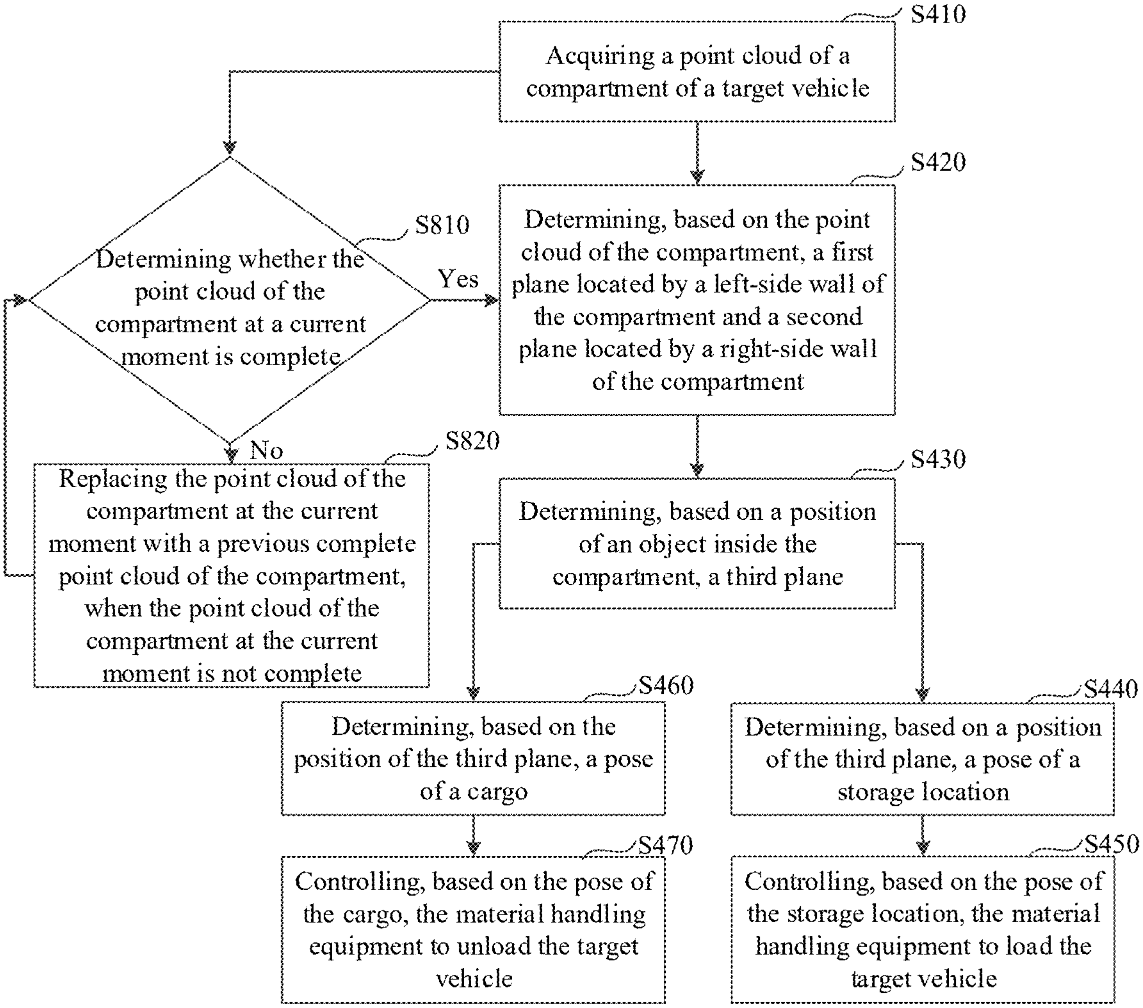
FIG. 8 is a schematic flowchart of a control method for material handling equipment according to yet still another embodiment of the present disclosure.

FIG. 8 is a schematic flowchart of a control method for material handling equipment according to yet still another embodiment of the present disclosure. The embodiment shown in FIG. 8 is extended based on the embodiment shown in FIG. 4. In the following, a difference between the embodiment shown in FIG. 8 and the embodiment shown in FIG. 4 will be described in detail and the same features will not be repeated herein again.

As shown in FIG. 8, the embodiment of the present disclosure further includes the following steps after acquiring the point cloud of the compartment of the target vehicle (Step S410).

Step S810: determining whether the point cloud of the compartment at a current moment is complete.

During the operation of the material handling equipment, the LiDAR of the material handling equipment needs to collect the point cloud of the compartment regularly or irregularly, so as to control the material handling equipment more accurately based on the latest collected point cloud of the compartment. The current moment may be understood as the latest moment of collection.

Exemplarily, the completeness of the point cloud may be determined based on information such as a coverage rate and density of the point cloud. For example, if the coverage rate of the point cloud is greater than 95%, then it is determined that the point cloud is complete. If the point cloud density is greater than 50 points per square meter, then it is determined that the point cloud is complete.

Step S820: replacing the point cloud of the compartment at the current moment with a previous complete point cloud of the compartment when the point cloud of the compartment at the current moment is not complete.

Exemplarily, in practical applications, after the point cloud of the compartment of the target vehicle is acquired, it is determined whether the point cloud of the compartment at the current moment is complete. If the point cloud of the compartment at the current moment is complete, then the first plane located by the left-side wall of the compartment and the second plane located by the right-side wall of the compartment are determined based on the point cloud of the compartment. If the point cloud of the compartment at the current moment is not complete, then the point cloud of the compartment at the current moment is replaced with the previous complete point cloud of the compartment. Then, the first plane located by the left-side wall of the compartment and the second plane located by the right-side wall of the compartment are determined, based on the point cloud (that is, the previous complete point cloud of the compartment) of the compartment.

In this embodiment of the present disclosure, by replacing the point cloud of the compartment at the current moment with the previous complete point cloud of the compartment when it is determined that the point cloud of the compartment at the current moment is not complete, the completeness of the point cloud is ensured. Thus, the purpose of improving the control safety of the material handling equipment without increasing the hardware cost is achieved.

An example of how to determine the third plane is described below with reference to FIGS. 9 to 11.

Figure 9:
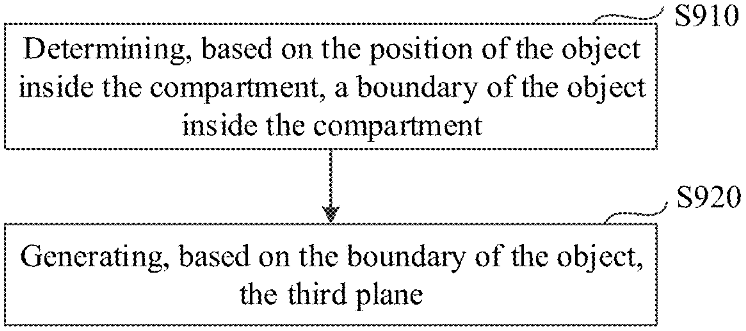
FIG. 9 is a schematic flowchart of determining, based on a position of an object inside a compartment, a third plane according to some embodiments of the present disclosure.

FIG. 9 is a schematic flowchart of determining, based on a position of an object inside a compartment, a third plane according to some embodiments of the present disclosure. The embodiment shown in FIG. 9 is extended based on the embodiment shown in FIG. 4. In the following, a difference between the embodiment shown in FIG. 9 and the embodiment shown in FIG. 4 will be described in detail and the same features will not be repeated herein again.

As shown in FIG. 9, in this embodiment of the present disclosure, the determining, based on the position of the object inside the compartment, the third plane, includes the following steps.

Step S910: determining, based on the position of the object inside the compartment, a boundary of the object inside the compartment.

Step S920: generating, based on the boundary of the object, the third plane.

Exemplarily, in practical applications, firstly, the boundary of the object inside the compartment is determined based on the position of the object inside the compartment, and then the third plane is generated based on the boundary of the object. Thus, it can be seen that this embodiment of the present disclosure achieves the purpose of determining spatial layout information within the compartment by using the boundary of the object inside the compartment.

If the object is of a regular shape (such as a cubic compartment), then the boundary of the object may be regarded as a straight line (which may be understood as a straight line in a top-down view of the compartment). If the object is of an irregular shape (such as soft-wrapped textiles), then the boundary of the object may be regarded as a non-straight line (which may be understood as a non-straight line in the top-down view of the compartment, as shown in FIG. 11).

An example of how to determine the third plane when the boundary of the object is a non-straight line is described below with reference to FIG. 10.

Figure 10:
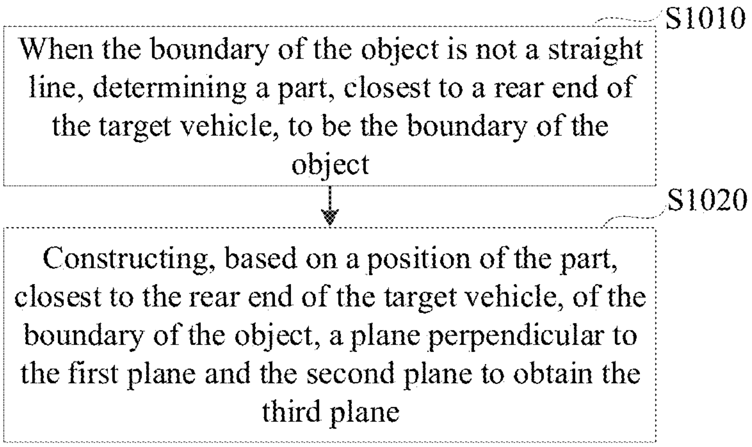
FIG. 10 is a schematic flowchart of generating, based on a boundary of an object, a third plane according to some embodiments of the present disclosure.
Figure 11:
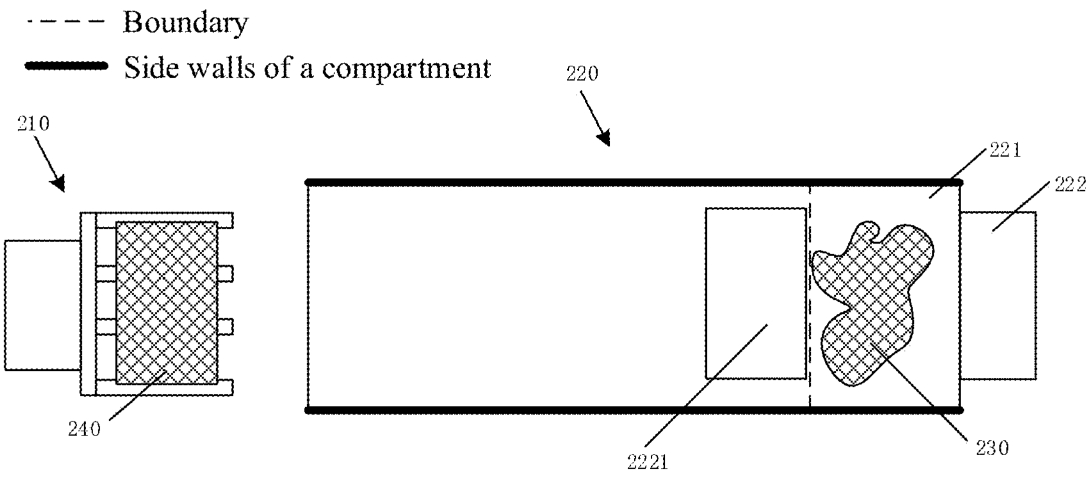
FIG. 11 is a schematic diagram of an application scenario of material handling equipment according to yet still another embodiment of the present disclosure.

FIG. 10 is a schematic flowchart of generating, based on a boundary of an object, a third plane according to some embodiments of the present disclosure. The embodiment shown in FIG. 10 is extended based on the embodiment shown in FIG. 9. In the following, a difference between the embodiment shown in FIG. 10 and the embodiment shown in FIG. 9 will be described in detail and the same features will not be repeated herein again.

As shown in FIG. 10, in this embodiment of the present disclosure, the generating, based on the boundary of the object, the third plane (Step 920), includes the following steps.

Step S1010: when the boundary of the object is not a straight line, determining a part, closest to a rear end of the target vehicle, to be the boundary of the object.

Step S1020: constructing, based on a position of the part, closest to the rear end of the target vehicle, of the boundary of the object, a plane perpendicular to the first plane and the second plane to obtain the third plane.

Exemplarily, in practical applications, if the boundary of the object is not the straight line, firstly, the part, closest to the rear end of the target vehicle, of the boundary of the object is determined. Then, the plane perpendicular to the first plane and the second plane is constructed based on the position of the part, closest to the rear end of the target vehicle, of the boundary of the object, to obtain the third plane. It can be seen that this embodiment of the present disclosure combines local feature extraction and spatial direction constraints to achieve the purpose of determining the third plane, thereby enabling the material handling equipment to be applicable to scenarios involving irregular objects.

An example of how to determine, based on the position of the third plane, the pose of the cargo is described below with reference to FIGS. 12 to 15.

Figure 12:
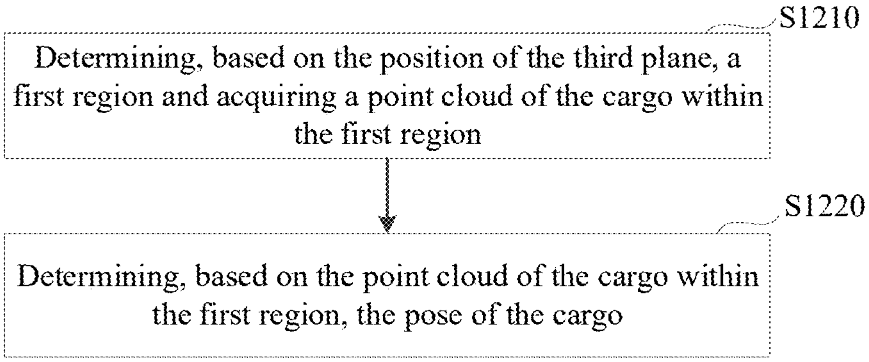
FIG. 12 is a schematic flowchart of determining, based on a position of a third plane, a pose of a cargo according to some embodiments of the present disclosure.

FIG. 12 is a schematic flowchart of determining, based on a position of a third plane, a pose of a cargo according to some embodiments of the present disclosure. The embodiment shown in FIG. 12 is extended based on the embodiment shown in FIG. 4. In the following, a difference between the embodiment shown in FIG. 12 and the embodiment shown in FIG. 4 will be described in detail and the same features will not be repeated herein again.

As shown in FIG. 12, in this embodiment of the present disclosure, the determining, based on the position of the third plane, the pose of the cargo (Step 460), includes the following steps.

Step S1210: determining, based on the position of the third plane, a first region and acquiring a point cloud of the cargo within the first region.

The first region is located between the third plane and a front end of the target vehicle. Exemplarily, the first region is located between the third plane and the front end of the target vehicle and is adjacent to the third plane. An area of the first region may be determined based on parameters such as a size of a pallet loaded with the cargo, which will not be uniformly limited in the embodiments of the present disclosure.

Step S1220: determining, based on the point cloud of the cargo within the first region, the pose of the cargo.

Exemplarily, in practical applications, firstly, the first region is determined based on the position of the third plane, and the point cloud of the cargo within the first region is obtained. Then, the pose of the cargo is determined based on the point cloud of the cargo within the first region. This embodiment of the present disclosure not only reduces the computational load by means of the first region, but also reduces interference by using the third plane as a physical barrier, thereby improving the calculation accuracy.

There may be a plurality of pallets of the cargo in the first region. In some embodiments, the material handling equipment further includes an attachment (including, but not limited to, the handling member 112 mentioned above), and the attachment is provided with a plurality of stations, configured to transport the plurality of pallets of the cargo. An example of how to determine the pose of the cargo to be transported when there are the plurality of pallets of the cargo in the first region is described below with reference to FIGS. 13 to 14.

FIG. 13 is a schematic flowchart of determining, based on a point cloud of a cargo within a first region, a pose of the cargo according to some embodiments of the present disclosure. The embodiment shown in FIG. 13 is extended based on the embodiment shown in FIG. 12. In the following, a difference between the embodiment shown in FIG. 13 and the embodiment shown in FIG. 12 will be described in detail and the same features will not be repeated herein again.

As shown in FIG. 12, in this embodiment of the present disclosure, the determining, based on the point cloud of the cargo within the first region, the pose of the cargo includes the following steps.

Step S1310: determining, based on the point cloud of the cargo within the first region, respective poses of the plurality of pallets of the cargo.

Step S1320: determining, based on the respective poses of the plurality of pallets of the cargo, at least two pallets of the cargo meeting a target condition.

Exemplarily, the target condition includes that the material handling equipment is capable of transporting the at least two pallets of the cargo simultaneously. FIG. 14 is a schematic flowchart of determining, based on respective poses of a plurality of pallets of the cargo, at least two pallets of the cargo meeting a target condition according to some embodiments of the present disclosure. As shown in FIG. 14, in this embodiment of the present disclosure, the determining, based on the respective poses of the plurality of pallets of the cargo, the at least two pallets of the cargo meeting the target condition (Step S1320), includes the following steps.

Step S1410: determining, based on the respective poses of the plurality of pallets of the cargo, an angle difference, a front-to-back difference, a height difference, and a spacing between each adjacent pair of the plurality of pallets of the cargo.

Step S1420: determining adjacent pairs of pallets of the cargo with the angle difference, the front-to-back difference, the height difference, and the spacing falling within a specified threshold range to be the at least two pallets of the cargo meeting the target condition.

Exemplarily, in practical applications, firstly, the angle difference, the front-to-back difference, the height difference, and the spacing between each adjacent pair of the plurality of pallets of the cargo are determined based on the respective poses of the plurality of pallets of the cargo. Then, adjacent pairs of the plurality of pallets of the cargo with the angle difference, the front-to-back difference, the height difference, and the spacing falling within a specified threshold range are determined to be the at least two pallets of the cargo meeting the target condition. In this embodiment of the present disclosure, relative positional relationships such as the angle difference, the front-to-back difference, the height difference and the spacing between each adjacent pair of the cargo are utilized to determine whether the two pallets of the cargo are suitable for simultaneous transportation. This not only avoids manual intervention but also achieves improvement in both operational safety and efficiency. Furthermore, specific shapes of the cargos are not limited in the embodiment of the present disclosure, thereby improving applicability in various scenarios.

Step S1330: determining, based on the respective poses of the at least two pallets of the cargo, the pose of the cargo.

Exemplarily, an average of the respective poses of the at least two pallets of the cargo is determined to be the pose of the cargo, so that the material handling equipment may simultaneously handle at least two pallets of the cargo.

Exemplarily, in practical applications, firstly, the respective poses of the plurality of pallets of the cargo are determined based on the point cloud of the cargo within the first region. Then, the at least two pallets of the cargo meeting the target condition are determined based on the respective poses of the plurality of pallets of the cargo. Finally, the pose of the cargo is determined based on the respective poses of the at least two pallets of the cargo. This embodiment of the present disclosure achieve a purpose of simultaneously transporting the plurality of pallets of the cargo by the material handling equipment, thereby significantly improving loading and unloading efficiency.

FIG. 15 is a schematic flowchart of determining, based on a position of a third plane, a first region and acquiring a point cloud of a cargo within the first region, according to some embodiments of the present disclosure. The embodiment shown in FIG. 15 is extended based on the embodiment shown in FIG. 12. In the following, a difference between the embodiment shown in FIG. 15 and the embodiment shown in FIG. 12 will be described in detail and the same features will not be repeated herein again.

As shown in FIG. 15, in this embodiment of the present disclosure, the determining, based on the position of the third plane, the first region and acquiring the point cloud of the cargo within the first region (Step S1210), includes the following steps.

Step S1510: determining the first region, bounded by the third plane, the first plane and the second plane.

Step S1520: performing cargo detection on the point cloud within the first region, to obtain the point cloud of the cargo within the first region.

Exemplarily, in practical applications, firstly, the first region bounded by the third plane, the first plane and the second plane is determined. Then, the cargo detection is performed to the point cloud within the first region to obtain the point cloud of the cargo within the first region. It can be seen that this embodiment of the present disclosure precisely locks a target region (that is, the first region) through multiple spatial constraints, and then uses three planes to shield interference sources of the point cloud, thereby solving problems of low processing efficiency and strong interference in point cloud processing.

An example of how to determine, based on the point cloud of the cargo within the first region, the pose of the cargo is described below with reference to FIGS. 16 to 19.

Figure 16:
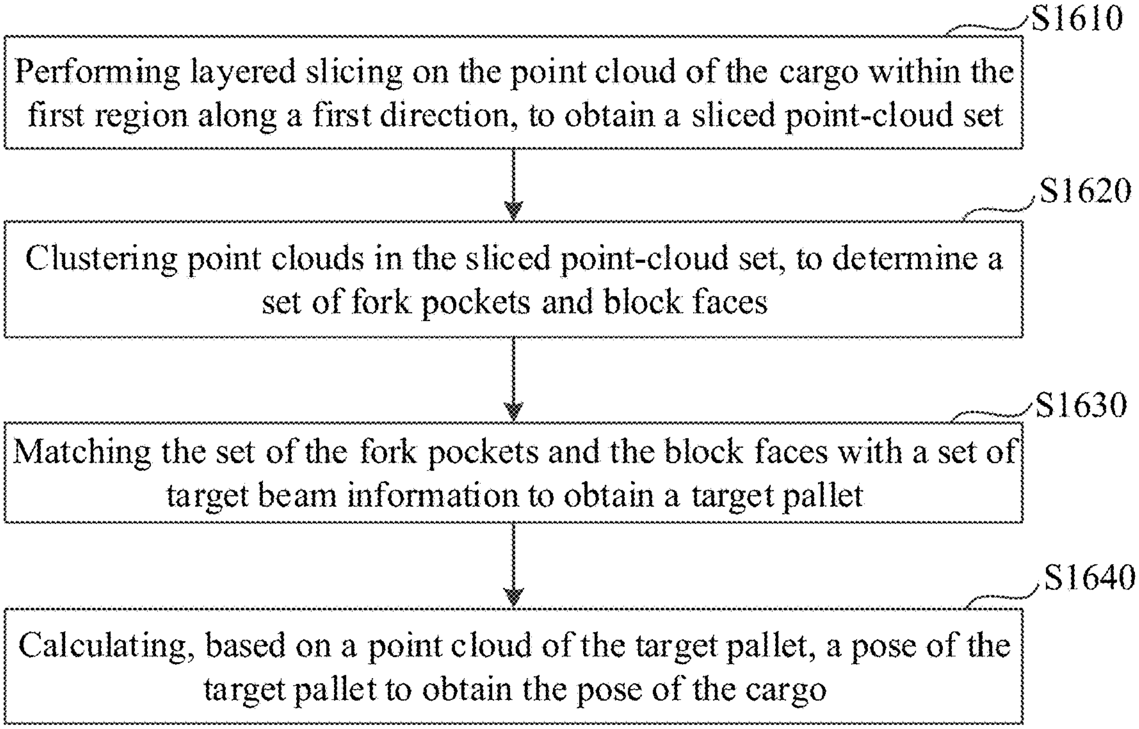
FIG. 16 is a schematic flowchart of determining, based on a point cloud of a cargo within a first region, a pose of the cargo according to some embodiments of the present disclosure.

FIG. 16 is a schematic flowchart of determining, based on a point cloud of a cargo within a first region, a pose of the cargo according to some embodiments of the present disclosure. The embodiment shown in FIG. 16 is extended based on the embodiment shown in FIG. 12. In the following, a difference between the embodiment shown in FIG. 16 and the embodiment shown in FIG. 12 will be described in detail and the same features will not be repeated herein again.

As shown in FIG. 16, in this embodiment of the present disclosure, the determining, based on the point cloud of the cargo within the first region, the pose of the cargo (Step S1220), includes the following steps.

Step S1610: performing layered slicing on the point cloud of the cargo within the first region along a first direction, to obtain a sliced point-cloud set.

The point cloud of the cargo within the first region includes at least one point cloud of a pallet. In some embodiments, the point cloud of the cargo within the first region is an original point cloud of a pallet collected by the sensor module of the material handling equipment. In some other embodiments, the point cloud of the cargo within the first region is obtained by processing (such as point cloud filtering) the original point cloud of the pallet collected by the sensor module of the material handling equipment.

The objective of this embodiment of the present disclosure is to select the point cloud of a target pallet meeting the target condition from the point cloud of the cargo within the first region. A quantity of target pallets may be one or greater than one. If the quantity of the target pallets is greater than one, the target condition may include that positional relationships between a plurality of target pallets meet a specific requirement, so as to ensure that the material handling equipment may simultaneously lift the plurality of target pallets.

Figure 18:
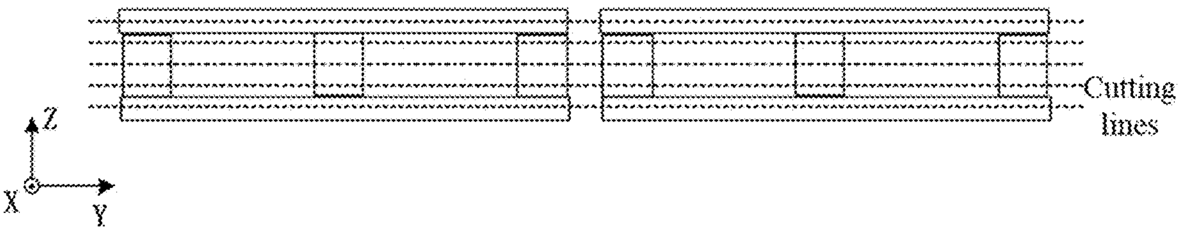
FIG. 18 is a schematic diagram of performing layered slicing along a first direction according to some embodiments of the present disclosure.

Layered slicing is a cutting method for acquiring a plurality of slices by cutting three-dimensional point cloud data along a specific direction at equal or unequal intervals. In this embodiment of the present disclosure, the specific direction is referred to as the first direction. Exemplarily, the first direction is the Z-axis direction as shown in FIG. 1. Sections of the plurality of slices include several planes parallel to the XOY plane. Alternatively, the first direction is a vertical direction, and the sections of the plurality of slices include several planes that are parallel to a horizontal plane. An example of how to perform layered slicing along the first direction is described below with reference to FIG. 18. FIG. 18 is a schematic diagram of performing layered slicing along a first direction according to some embodiments of the present disclosure. As shown in FIG. 18, two pallets of the same model are located at the same horizontal level. The dotted lines refer to cutting lines for layered slicing along the Z-axis direction. Spacing between adjacent cutting lines may be determined according to actual situations, which will not be limited in the embodiments of the present disclosure. Additionally, the layered slicing may also be overlapping slicing, that is, there is an overlapping section between adjacent slices, which will not be limited in the embodiments of the present disclosure.

In some embodiments, step S1610 may be implemented as follows: performing layered slicing on the point cloud of the target pallet along the Z-axis direction, to obtain the sliced point-cloud set. Where the sliced point-cloud set contains point clouds of the plurality of slices.

Step S1620: clustering point clouds in the sliced point-cloud set, to determine a set of fork pockets and block faces.

A core objective of clustering is to divide objects in a data set into several groups (also known as clusters), such that similarity within the same group is maximized and difference between different groups is maximized.

The set of the fork pockets and the block faces includes at least one fork pocket and at least two block faces. That is, by clustering the point clouds in the sliced point-cloud set, a plurality of point cloud clusters are obtained. Each point cloud cluster is regarded as a block face, and a fork pocket is located between each two adjacent point cloud clusters. Thus, a set of the fork pockets and the block faces is generated.

In some embodiments, step S1620 may be implemented as follows: clustering point clouds of each slice in the sliced point-cloud set, to determine the set of the fork pockets and the block faces.

Step S1630: matching the set of the fork pockets and the block faces with a set of target beam information to obtain a target pallet.

The information set of the target beams contains information of a plurality of beams. The information of the beam of the pallet is a digital archive that describes a physical structure, geometric parameters, material properties and operation specifications of the pallet, and is identification information of the pallet.

The information set of the target beams may be a set of beam information specified by a user, or a set of beam information selected by the controller of the material handling equipment based on historical handling experience, which will not be limited in the embodiments of the present disclosure.

This embodiment of the present disclosure achieves a purpose of determining the target pallet based on pallet models by matching the set of the fork pockets and the block faces with the information set of the target beams.

Step S1640: calculating, based on a point cloud of the target pallet, a pose of the target pallet to obtain the pose of the cargo.

After acquiring the point cloud of the target pallet, the pose of the target pallet may be calculated based on the point cloud of the target pallet, and thus the pose of the cargo may be obtained.

Exemplarily, in practical applications, firstly, layered slicing is performed to the point cloud of the cargo within the first region along the first direction, to obtain the sliced point-cloud set. Then, point clouds in the sliced point-cloud set are clustered to determine the set of the fork pockets and the block faces. Subsequently, the target pallet is obtained by matching the set of the fork pockets and the block faces with the information set of the target beams. And the pose of the cargo is obtained by calculating, based on the point cloud of the target pallet, the pose of the target pallet.

According to the embodiment of the present disclosure, the clustering is performed to the point clouds of slices in the sliced point-cloud set to determine the set of the fork pockets and the block faces. Thus, not only can it significantly reduce the amount of data processing and improve detection efficiency, but it can also reduce or even avoid interference of factors such as texture of a surface of the pallet and a material of the pallet, improving detection accuracy and robustness. Furthermore, in this embodiment of the present disclosure, by matching the set of the fork pockets and the block faces with the information set of the target beams, it is possible to achieve adaptive recognition of the pallet model, significantly reducing probability of incorrect recognition of the pallet, and thereby further improving the detection accuracy. Moreover, in the embodiment of the present disclosure, a quantity of the pallets is not limited per pallet detection, so that simultaneous detection of the plurality of pallets is enabled, not only saving detection time and improving real-time detection, but also achieving a purpose of simultaneous detection of multiple pallets. Especially for the plurality of pallets not placed in a standard manner, the plurality of pallets may be detected simultaneously in the embodiment of the present disclosure, thereby improving applicability.

An example of how to generate the set of the fork pockets and the block faces is described below with reference to FIG. 17.

Figure 17:
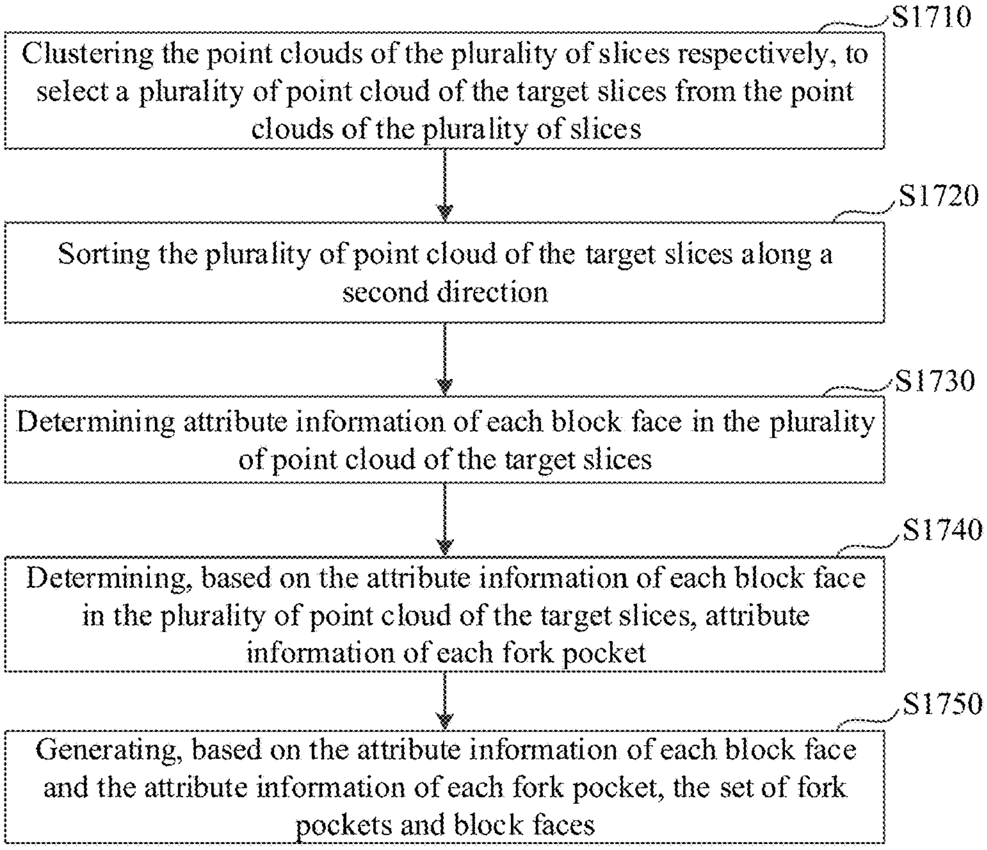
FIG. 17 is a schematic flowchart of clustering point clouds in a sliced point-cloud set, to determine a set of fork pockets and block faces according to some embodiments of the present disclosure.

FIG. 17 is a schematic flowchart of clustering point clouds in a sliced point-cloud set, to determine a set of fork pockets and block faces according to some embodiments of the present disclosure. The embodiment shown in FIG. 17 is extended based on the embodiment shown in FIG. 16. In the following, a difference between the embodiment shown in FIG. 17 and the embodiment shown in FIG. 16 will be described in detail and the same features will not be repeated herein again.

As shown in FIG. 17, in this embodiment of the present disclosure, the clustering the point clouds in the sliced point-cloud set, to determine the set of fork pockets and block faces (Step S1620), includes the following steps.

Step S1710: clustering the point clouds of the plurality of slices respectively, to select a plurality of point cloud of the target slices from the point clouds of the plurality of slices.

Step S1710 may also be considered as screening the point clouds of the plurality of slices mentioned above through clustering, thereby acquiring the point clouds of the plurality of target slices meeting a specific requirement.

Step S1720: sorting point clouds of the plurality of target slices along a second direction.

The second direction is parallel to a section of layered slicing. For example, the second direction is the Y-axis direction as shown in FIGS. 1 and 18. If the coordinate system shown in FIG. 18 is taken as the reference, as one possible implementation method, layered slicing of the target point cloud may be performed along the Z-axis, to obtain the sliced point-cloud set, and then the point clouds of the plurality of target slices are sorted along the Y-axis. Sorting the point clouds of the plurality of target slices along the Y-axis direction may be understood as sorting based on coordinate values of the point clouds of the plurality of target slices along the Y-axis direction.

Step S1730: determining attribute information of each block face in the point clouds of the plurality of target slices.

Exemplarily, firstly, the attribute information of each point cloud cluster within each point cloud of the target slice may be calculated. Then, the point cloud clusters with the same or similar attribute information in the point clouds of the plurality of target slices may be regarded as the same block face and merged to calculate the attribute information of the block face. Subsequently, the attribute information of each block face may be obtained.

Step S1740: determining, based on the attribute information of each block face in the point clouds of the plurality of target slices, attribute information of each fork pocket.

Exemplarily, the attribute information of the block face represents some information of features, such as a size and/or a position of the block face. Similarly, the attribute information of the fork pocket represents some information of features, such as a size and/or a position of the fork pocket. Taking the coordinate system shown in FIG. 18 as an example, the attribute information of the block face includes a maximum value in the Y-axis direction, recorded as $Y_{max}$; a minimum value in the Y-axis direction, recorded as $Y_{min}$; a central value in the Y-axis direction, recorded as $Y_{center}$; a maximum value in the Z-axis direction, recorded as $Z_{max}$; and a minimum value in the Z-axis direction, recorded as $Z_{min}$.

Step S1750: generating, based on the attribute information of each block face and the attribute information of each fork pocket, the set of fork pockets and block faces.

Exemplarily, in practical applications, firstly, the point clouds of the plurality of slices are clustered respectively, to select the point clouds of the plurality of target slices from the point clouds of the plurality of slices. Then, the point clouds of the plurality of target slices are sorted along the second direction, and the attribute information of each block face in the point clouds of the plurality of target slices is determined. The attribute information of each fork pocket is determined based on the attribute information of each block face in the point clouds of the plurality of target slices. And subsequently, the set of the fork pockets and the block faces is generated based on the attribute information of each block face and the attribute information of each fork pocket.

This embodiment of the present disclosure achieves a purpose of selecting the target slice from the plurality of slices by clustering each slice. Compared with directly processing the plurality of slices, this method not only significantly reduces a computational load, but also greatly minimizes interference data. Furthermore, according to the embodiment of the present disclosure, by sorting the point clouds of the plurality of target slices, an accurate topological relationship between the target slices is established, so that a cumulative error in point cloud registration may be reduced, thereby improving accuracy of the set of the fork pockets and the block faces and providing a premise for ultimately acquisition of an accurate pose of the target pallet.

In some embodiments, before the step of determining attribute information of each block face in the point clouds of the plurality of target slices (that is, step S1730), the controller of the material handling equipment is further configured to execute program instructions to implement the following steps: for each category included in the plurality of point cloud of the target slice, calculating a central value of the point cloud of the category in the second direction; and performing, based on the central value of the point cloud of the category in the second direction, outlier filtering on the point cloud of the category. The embodiments of the present disclosure employ local statistical filtering based on the central value of the category to precisely determine an actual distribution range of blocks of the pallet, and conduct independent filtering in the second direction, thereby resolving difficulty in coupling multi-directional point clouds, and ultimately achieving a purpose of targeted noise removal.

In some embodiments, the step of clustering the point clouds of the plurality of slices respectively, to select a plurality of point cloud of the target slices from the point clouds of the plurality of slices includes: clustering the point clouds of the plurality of slices respectively, to obtain a quantity of categories corresponding to each slice; and determining, based on the quantity of categories corresponding to each slice, a slice with a maximum quantity of categories to be the target slice.

In some embodiments, the maximum quantity of categories is determined based on the quantity of categories corresponding to each slice mentioned-above. For example, the maximum value among the number of categories corresponding to each of the plurality of slices is determined as the maximum number of categories. For example, there are a total of 6 slices. The quantity of categories corresponding to each slice is shown in Table 1 below.

TABLE 1

| Serial Number | Slice 1 | Slice 2 | Slice 3 | Slice 4 | Slice 5 | Slice 6 |
|---|---|---|---|---|---|---|
| Quantity of categories | 2 | 2 | 6 | 6 | 2 | 2 |

By analyzing Table 1, it can be seen that the maximum quantity of categories corresponding to each slice is 6. Therefore, the maximum quantity of categories is determined to be 6, and Slice 3 and Slice 4 with the quantity of categories being 6 are determined to be the target slices.

This embodiment of the present disclosure achieves a purpose of selecting the target slice from the plurality of slices by determining the slices with the maximum quantity of categories as the target slices. Since the slices with the maximum quantity of categories contain more information, the embodiment of the present disclosure may ensure accuracy of the pose of the target pallet while saving computing power.

In some embodiments, firstly, clustering is performed to the point cloud of each slice, taking the quantity of categories as a frequency of the slice. Then, the attribute information of each category is analyzed statistically. Still taking the coordinate system shown in FIG. 18 as the reference, the first direction is the Z-axis direction, and the second direction is the Y-axis direction. Then, the attribute information of each category includes a maximum value in the Y-axis direction, recorded as Y_max; a minimum value in the Y-axis direction, recorded as Y_min; a maximum value in the Z-axis direction, recorded as Z_max; a minimum value in the Z-axis direction, recorded as Z_min; and a central value of the category, recorded as Y_center. Slices with the quantity of categories being the maximum quantity of categories, recorded as num_cluster, are extracted as the target slices. Point clouds of the target slices are then sorted by coordinates in the Y-axis. Subsequently, for each category in each point cloud of the target slice, a coordinate of a center of the category in the Y-axis, recorded as Y_center is acquired for outlier filtering on remove unqualified categories. Finally, the attribute information of each block face is statistically acquired in the block faces of the maximum quantity (that is, num_cluster) to obtain an attribute list of the block faces. Based on the attribute information of the block faces of the maximum quantity (that is, num_cluster), the attribute information of fork pockets is generated and then sequentially added into the set of the fork pockets and the block faces by sorting in coordinates in the Y-axis.

In some embodiments, the quantity of the target pallets is greater than one. Correspondingly, after the step of calculating, based on the point cloud of the target pallet, the pose of the target pallet to obtain the pose of the cargo, the method may further include: determining, based on poses of each target pallet, relative poses between the plurality of target pallets and an average pose; determining, based on the relative poses, whether the material handling equipment is capable of simultaneously handling the plurality of target pallets; when it is determined based on the relative poses that the material handling equipment is capable of simultaneously handling the plurality of target pallets, feeding back the average pose of the plurality of target pallets to a control system of the material handling equipment to control the material handling equipment to handle the plurality of target pallets simultaneously; and when it is determined based on the relative poses that the material handling equipment is not capable of simultaneously handling the plurality of target pallets, removing at least one target pallet and determining, based on the relative poses, whether the material handling equipment is capable of simultaneously handling remaining target pallets.

Exemplarily, the relative poses include: one or more of a height difference between each two adjacent target pallets, an angle difference between each two adjacent target pallets, and a front-to-back difference between each two adjacent target pallets. A calculation method of the average pose, the height difference, the angle difference and the front-to-back difference will be illustrated in the following by taking two target pallets as an example.

Assuming that the pose of each target pallet includes three coordinate values in the XYZ reference coordinate system and a yaw angle, recorded as yaw. That is, a pose of a first target pallet is shown as the following formula: $pose_1=(x_1, y_1, z_1, yaw_1)$, and a pose of the second target pallet is shown as the following formula: $pose_2=(x_2, y_2, z_2, yaw_2)$. Then, an average pose between the first target pallet and the second target pallet may be calculated by the following formula (1), an average height difference $\Delta h$ between the first target pallet and the second target pallet may be calculated by the following formula (2), an angle difference $\Delta\theta$ between the first target pallet and the second target pallet may be calculated by the following formula (3).

$$pose_{average} = (pose_1 + pose_2)/2 = (x_{averrage}, y_{averrage}, z_{averrage}, \text{yaw}_{averrage}) \quad (1)$$

$$\Delta h = \text{abs}(z_2 - z_1) \quad (2)$$

$$\Delta\theta = \text{abs}(\text{yaw}_2 - \text{yaw}_1) \quad (3)$$

In formula (1), $$x_{averrage} = (x_1 + x_2)/2,\ y_{averrage} = (y_1 + y_2)/2,$$

$$z_{averrage} = (z_1 + z_2)/2,\ \text{yaw}_{averrage} = (yaw_1 + yaw_2)/2.$$

In formulas (2) and (3), abs is an abbreviation for absolute value.

Exemplarily, the XYZ reference coordinate system mentioned above is a coordinate system of the material handling equipment. That is, a coordinate origin is set at a center of the material handling equipment, a forward direction of the material handling equipment is a positive direction of the X-axis, a height direction of the material handling equipment is the Z-axis direction, and the yaw angle is an angle between a normal vector of a fork insertion surface of the pallet and the forward direction of the material handling equipment in the horizontal plane. In some embodiments, coordinates of a center point of the fork insertion surface of the pallet are taken as the coordinates (that is, the pose) of the pallet.

In some embodiments, a step of calculating the front-to-back difference between each two adjacent target pallets may include: determining normal vectors of the average pose of the plurality of target pallets; and determining a distance between planes that are perpendicular to the normal vector and pass through center points of respective pallets of the two adjacent target pallets to be the front-to-back difference.

For example, supposing that the center point of the first target pallet is $center_1$, the center point of the second target pallet is $center_2$, and the normal vector of the average pose $Pose_{average}$ between the first target pallet and the second target pallet is $N_{average}$. Then, the front-to-back difference is a distance between two planes that are perpendicular to $N_{average}$ and pass through the center point, recorded as $center_1$, of the first target pallet and the center point, recorded as $center_2$, of the second target pallet, respectively.

In this embodiment of the present disclosure, by determining the normal vector of the average pose of the plurality of target pallets, and determining the distance between the planes perpendicular to the normal vector and passing through the center points of any two adjacent target pallets as the front-to-back difference, the purpose of calculating the front-to-back difference between any two adjacent target pallets is achieved. This embodiment of the present disclosure uses the normal vector to unify a determination criteria for the front-to-back difference, which not only improves the accuracy of the calculation but also improves the calculation efficiency and reduces a calculation error.

Exemplarily, a target pallet with a pose significantly different from those of other target pallets may be removed by determining whether the pose differs significantly based on the relative poses. For example, if the front-to-back difference is greater than a target front-to-back difference threshold. Alternatively, a target pallet with a model different from those of other target pallets the target pallets (for example, a beam ID is different from the others) may be removed.

Exemplarily, in practical application, the relative poses between the plurality of target pallets and an average pose are determined based on the poses of each target pallet; if it is determined based on the relative poses that the material handling equipment is capable of simultaneously handling the plurality of target pallets, then the average pose of the plurality of target pallets will be fed back to the control system of the material handling equipment, so as to control the material handling equipment to handle the plurality of target pallets simultaneously; if it is determined based on the relative poses that the material handling equipment is not capable of simultaneously handling the plurality of target pallets, then at least one target pallet is removed and whether the material handling equipment is capable of simultaneously handling remaining target pallets is determined.

The embodiment of the present disclosure not only achieves a purpose of simultaneously transporting the plurality of target pallets to improve operational efficiency, but also avoids a risk associated with blindly transportation of a plurality of target pallets by a material handling equipment at a time, thereby reducing probability of accidents such as collision and overturning.

An example of how to calculate, based on the point cloud of the target pallet, the pose of the target pallet is described below with reference to FIG. 19.

Figure 19:
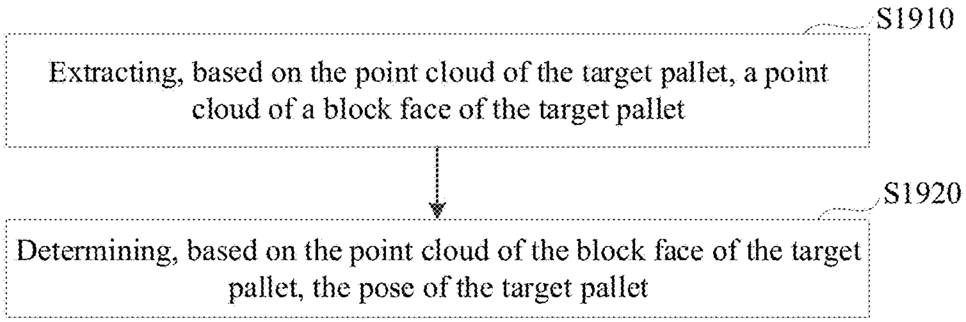
FIG. 19 is a schematic flowchart of calculating, based on a point cloud of a target pallet, a pose of the target pallet according to some embodiments of the present disclosure.

FIG. 19 is a schematic flowchart of calculating, based on a point cloud of a target pallet, a pose of the target pallet according to some embodiments of the present disclosure. The embodiment shown in FIG. 19 is extended based on the embodiment shown in FIG. 16. In the following, a difference between the embodiment shown in FIG. 19 and the embodiment shown in FIG. 16 will be described in detail and the same features will not be repeated herein again.

As shown in FIG. 19, in this embodiment of the present disclosure, the calculating, based on the point cloud of the target pallet, the pose of the target pallet to obtain the pose of the cargo, includes the following steps.

Step S1910: extracting, based on the point cloud of the target pallet, a point cloud of a block face of the target pallet.

Step S1920: determining, based on the point cloud of the block face of the target pallet, the pose of the target pallet.

According to this embodiment of the present disclosure, by means of extracting, based on the point cloud of the target pallet, the point cloud of the block face of the target pallet, and determining, based on the point cloud of the block face of the target pallet, the pose of the target pallet, a purpose of calculating, based on the point cloud of the target pallet, the pose of the target pallet may be achieved. It can be seen that in this embodiment of the present disclosure, the pose of the target pallet is determined based on the point cloud of the block face. Compared with a scheme of determining the pose of the target pallet by using an entire point cloud of the target pallet, the embodiment of the present disclosure not only reduces computing power but also has a higher tolerance for occlusions and better robustness. Even if a non-block-face part of the target pallet is obscured (that is, the entire point cloud of the target pallet is not complete), the embodiment of the present disclosure may still achieve a purpose of determining the pose of the target pallet.

In some embodiments, the step of extracting, based on the point cloud of the target pallet, the point cloud of the block face of the target pallet (Step S1910), includes: performing plane fitting on the point cloud of the target pallet to determine a plane located by the block face of the target pallet; removing, based on the plane located by the block face of the target pallet, point clouds beyond a specified distance from the plane; determining, based on the attribute information of the fork pocket of the target pallet, a height range of the fork pocket; and determining, based on the height range of the fork pocket and the attribute information of the block face of the target pallet, the point cloud of the block face of the target pallet.

The specified distance may be determined according to an actual situation, which will not be limited in the embodiments of the present disclosure. In some embodiments, the step of removing, based on the plane located by the block face of the target pallet, point clouds beyond a specified distance from the plane may also be deleted according to an actual requirement.

Exemplarily, the step of determining, based on the attribute information of the fork pocket of the target pallet, the height range of the fork pocket, includes: extracting, based on the attribute information of the fork pocket of the target pallet, point clouds corresponding to the fork pocket and the beam of the target pallet; and performing, based on the point clouds corresponding to the fork pocket and the beam of the target pallet, linear fitting to determine the height range of the fork pocket. In the embodiment of the present disclosure, an axial distribution feature of the fork pockets is utilized to determine the height range of the fork pockets, so that precise calculation of the height range of the target pallet may be achieved, not only significantly reducing the calculation error but also greatly improving the calculation efficiency.

According to the embodiment of the present disclosure, by filtering the point cloud of the target pallet through dual physical conditions including plane fitting (block face) and height constraint (fork pocket), an accurate point cloud of the block face is acquired, not only achieving a goal of balancing accuracy and robustness, but also improving the computational efficiency.

In some embodiments, the step of determining, based on the point cloud of the block face of the target pallet, the pose of the target pallet (Step S1920), includes: performing, based on the point cloud of the block face of the target pallet, plane fitting to obtain a plane equation of the point cloud; determining, based on the plane equation of the point cloud, an angle between a normal vector of the plane equation and a forward direction of the material handling equipment; and determining, based on a center point of the block face of the target pallet, three-dimensional coordinates of the target pallet in the coordinate system of the material handling equipment.

This embodiment of the present disclosure calculates the yaw angle of the target pallet by using the normal vector of the block face, so that the computational load is low. Furthermore, in the embodiment of the present disclosure, the center point is calculated under the constraint of the plane equation, thereby eliminating a coordinate offset caused by cargo occlusion.

In some embodiments, the step of matching the set of the fork pockets and the block faces with a set of target beam information to obtain the target pallet, includes: combining, based on beam information in the set of target beam information, adjacent fork pockets and block faces in the set of the fork pockets and the block faces, to obtain at least one candidate pallet and a matching degree of combination of the at least one candidate pallet; identifying at least one candidate pallet meeting a constraint condition; determining a pallet whose matching degree of combination is greater than a target matching degree of combination in the at least one pallet meeting the constraint condition, to be the target pallet.

Exemplarily, for each beam information in the information set of the target beams, the block face and fork pocket are combined based on the beam information to obtain possible pallets (that is, candidate pallets), and the candidate pallets are scored based on the beam information to obtain a matching score of the candidate pallet (indicating the matching degree of combination).

In some embodiments, the beam information only includes a sizes of a beam. Then, firstly, adjacent two block faces and a fork pocket therebetween are attempted to be combined into a unit; and a length of the unit is calculated to match a length of each beam in the beam information. Subsequently, three block faces arranged sequentially and two fork pockets therebetween are attempted to be combined; and a length of the unit is calculated to match the length of each beam in the beam information. In this way, a quantity of blocks and fork pockets included in the combination is gradually increased until all possible combinations have been traversed. That is to say, if the beam information does not provide a quantity of blocks but only gives sizes of the beam, then a combination strategy from small to large will be adopted for enumeration and matching to generate possible pallets (that is, the candidate pallets).

In some embodiments, the beam information includes a standard quantity of blocks, recorded as N. Then, the combination that exactly contains N block faces and corresponding fork pockets is searched for in the set of the fork pockets and the block faces. A spacing between block faces in the combination, as well as an entire outline length, should be matched with a block spacing and a pallet length defined in the beam information, thereby generating the possible pallets (that is, the candidate pallets).

In some embodiments, for each candidate pallet obtained through any of the above methods, a degree of conformity of its geometric dimensions (such as a total length, a total width, and the block spacing) to standard dimensions defined in the current beam information is scored comprehensively. The higher the degree of conformity is, the higher the score will be. Finally, a combination with a highest matching score among all the candidate pallets is selected as the target pallet.

Exemplarily, the constraint condition may include that the fork pockets and the block faces are not combined repeatedly.

The target matching degree of combination may be determined based on actual situations. For example, the target matching degree of combination may be defined as a matching score greater than 90 points. Then, the pallets in the candidate pallets that have a matching score higher than 90 points are determined to be the target pallets.

This embodiment of the present disclosure combines the fork pocket and the block face based on the beam information, thereby reducing a false detection rate of the pallet. Moreover, by using the constraint condition and the matching degree of combination, the candidate pallets obtained are hierarchically screened, achieving a two-way optimization of accuracy and efficiency.

In some embodiments, before the step of performing layered slicing on the point cloud of the cargo within the first region along the first direction, to obtain the sliced point-cloud set, the method may further include: determining a first point cloud collected by a sensor of the material handling equipment and a target storage location; performing extraction, based on the target storage location, on the first point cloud to determine a second point cloud corresponding to the target storage location; and determining, based on the second cloud, the point cloud of the cargo within the first region. This embodiment of the present disclosure reduces a processing range of the point cloud by utilizing the target storage location, thereby improving the accuracy and computational efficiency.

The sensor of the material handling equipment may be the sensor module mentioned in the above embodiments or a part of the sensor module. The sensor includes, but is not limited to, LiDAR, cameras, etc. The first point cloud is the point cloud within the first region, and may also be referred to as an original point cloud.

In some embodiments, the determining, based on the second cloud, the point cloud of the cargo within the first region, includes: performing point cloud filtering on the second cloud to obtain the point cloud of the cargo within the first region; where the point cloud filtering includes removal of noise points in a different direction from the normal vector of the block face and ground point clouds. Optionally, the point cloud filtering may further include removal of interference noise. The embodiment of the present disclosure is capable of removing ground point clouds and floating noise points in the direction of non-normal vectors, thereby improving accuracy.

Exemplarily, specific implementation methods of point cloud filtering include at least one of point cloud down sampling, point cloud raster height filtering, point cloud intensity filtering, point cloud density filtering, and normal filtering.

Exemplarily, the performing point cloud filtering on the second cloud to obtain the point cloud of the cargo within the first region includes: performing the point cloud filtering on the second point cloud to obtain a third point cloud; and projecting the third point cloud along a forward direction of the material handling equipment, to obtain the point cloud of the cargo within the first region. In this embodiment of the present disclosure, by projecting the point cloud along the forward direction of the material handling equipment, it is possible to achieve a purpose of point cloud dimension reduction while maintaining a topological relationship of the point cloud of the block face unchanged, thereby further improving the computational efficiency An example of how to determine, based on the position of the third plane, the pose of the storage location is described below with reference to FIG. 20.

Figure 20:
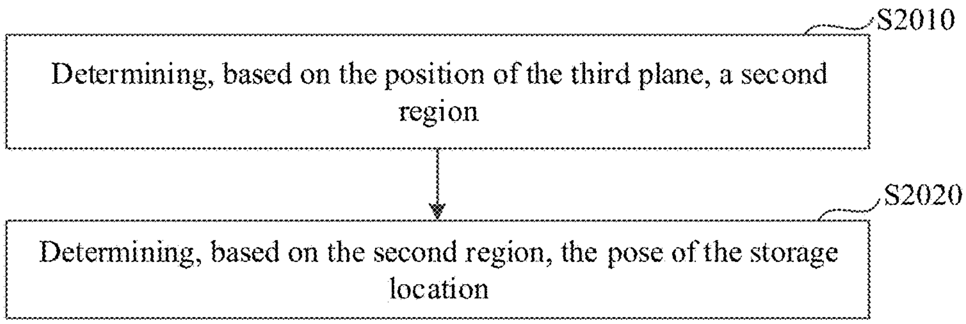
FIG. 20 is a schematic flowchart of determining, based on a position of a third plane, a pose of a storage location according to some embodiments of the present disclosure.

FIG. 20 is a schematic flowchart of determining, based on a position of a third plane, a pose of a storage location according to some embodiments of the present disclosure. The embodiment shown in FIG. 20 is extended based on the embodiment shown in FIG. 4. In the following, a difference between the embodiment shown in FIG. 20 and the embodiment shown in FIG. 4 will be described in detail and the same features will not be repeated herein again.

As shown in FIG. 20, in this embodiment of the present disclosure, the determining, based on the position of the third plane, the pose of the storage location includes the following steps.

Step S2010: determining, based on the position of the third plane, a second region.

The second region is located between the third plane and a rear end of the target vehicle.

Exemplarily, the determining, based on the position of the third plane, the second region includes: determining, based on dimensions of a cargo to be placed and a loading spacing, the second region bounded by the third plane, the first plane and the second plane. It can be seen that the determination of the second region has fully taken into account actual conditions such as a size of the cargo to be placed and the loading spacing, thus achieving higher accuracy.

Step S2020: determining, based on the second region, the pose of the storage location.

Exemplarily, the determining, based on the second region, the pose of the storage location includes: acquiring, based on a direction parallel to the first plane and the second plane, and the second region, the pose of the storage location. For example, the direction parallel to the first plane and second plane may be a direction in which the front end of the vehicle extends to the rear end of the vehicle.

According to the embodiment of the present disclosure, by means of determining based on the position of the third plane, the second region, and then determining, based on the second region, the pose of the storage location, a purpose of determining the pose of the storage location based on the position of the third plane may be achieved. The embodiment of the present disclosure further narrows a processing range of point clouds by means of the second region, thereby improving a computing speed and accuracy.

Figure 21:
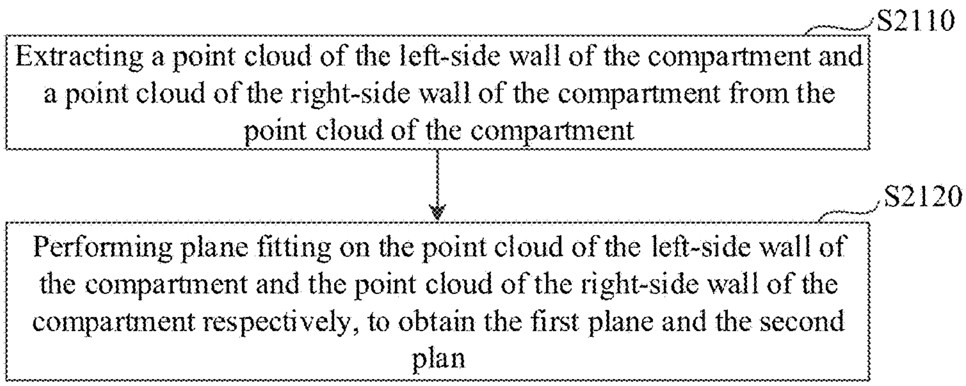
FIG. 21 is a schematic flowchart of determining, based on a point cloud of a compartment, a first plane located by a left-side wall of the compartment and a second plane located by a right-side wall of the compartment according to some embodiments of the present disclosure.

FIG. 21 is a schematic flowchart of determining, based on a point cloud of a compartment, a first plane located by a left-side wall of the compartment and a second plane located by a right-side wall of the compartment according to some embodiments of the present disclosure. The embodiment shown in FIG. 21 is extended based on the embodiment shown in FIG. 4. In the following, a difference between the embodiment shown in FIG. 21 and the embodiment shown in FIG. 4 will be described in detail and the same features will not be repeated herein again.

As shown in FIG. 21, in the embodiments of the present disclosure, the step of determining a first plane located by a left-side wall of the compartment and a second plane located by a right-side wall of the compartment, based on the point cloud of the compartment (step S420), includes the following steps.

Step S2110: extracting a point cloud of the left-side wall of the compartment and a point cloud of the right-side wall of the compartment from the point cloud of the compartment.

Step S2120: performing plane fitting on the point cloud of the left-side wall of the compartment and the point cloud of the right-side wall of the compartment respectively, to obtain the first plane and the second plane.

It can be seen that, in this embodiment of the present disclosure, by means of performing plane fitting on the point cloud of the left-side wall of the compartment and the point cloud of the right-side wall of the compartment respectively, the first plane and the second plane are obtained. The plane fitting technology may adapt to deformation of the compartment, thereby improving positioning accuracy of the side wall plane. Moreover, pre-stored information such as vehicle model parameters may not be required for plane fitting, making it applicable to a wider range of vehicle models.

Based on the same inventive concept, embodiments of the present disclosure further provides material handling equipment including a controller configured to execute program instructions to implement the control method for material handling equipment provided by any of the embodiments.

It should be noted that the control method for material handling equipment mentioned in the above embodiments may be executed by the controller of the material handling equipment or by other hardware devices, such as a server or a controller deployed in the cloud, which will not be limited in the embodiments of the present disclosure. An example is described below with reference to FIG. 22.

Figure 22:
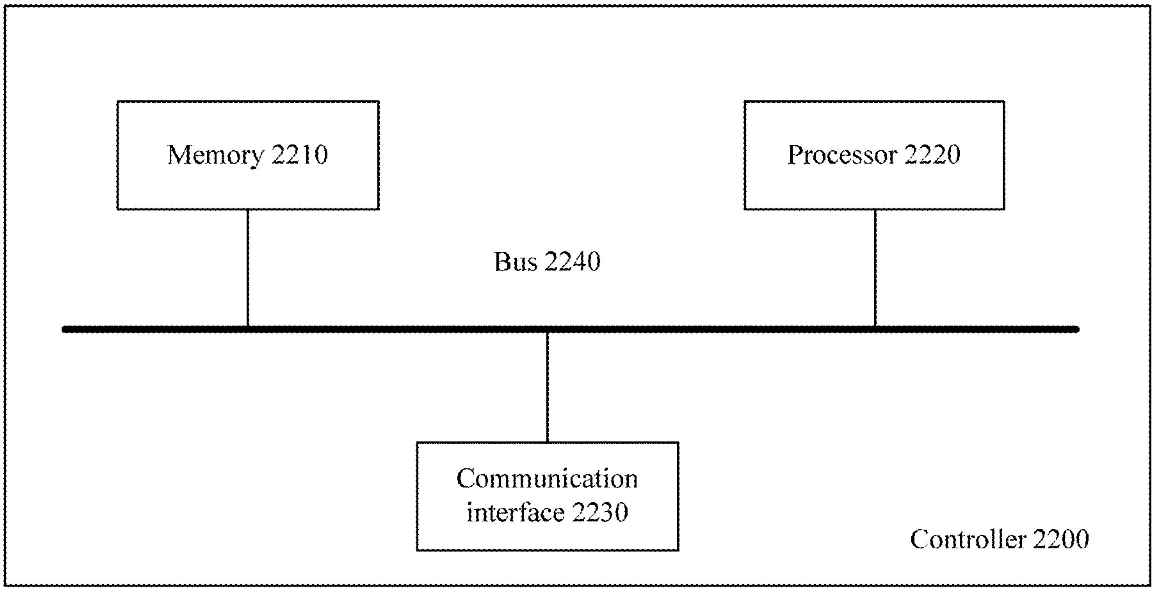
FIG. 22 is a schematic structural diagram of a controller according to some embodiments of the present disclosure.

FIG. 22 is a schematic structural diagram of a controller according to some embodiments of the present disclosure. As shown in FIG. 22, a controller 2200 includes a memory 2210, a processor 2220, a communication interface 2230 and a bus 2240. The memory 2210, the processor 2220, and the communication interface 2230 are in communication with each other through the bus 2240.

The memory 2210 may be a Read-Only Memory (ROM), a static storage device, a dynamic storage device or a Random Access Memory (RAM), etc. The memory 2210 is configured to store computer programs. When the computer programs stored in the memory 2210 are executed by the processor 2220, the processor 2220 and the communication interface 2230 are configured to perform each step of the control method for material handling equipment of the embodiments of the present disclosure.

The processor 2220 may employ a general Central Processing Unit (CPU), a microprocessor, an Application Specific Integrated Circuit (ASIC), a Graphics Processing Unit (GPU), or one or more of integrated circuits to execute relevant programs, to achieve the functions required by the controller of the embodiments of the present disclosure.

The processor 2220 may also be an integrated circuit chip with an ability of processing signals. During an implementation process, each step of the control method for material handling equipment disclosed in the present disclosure may be accomplished through the integrated logic circuits of the hardware in the processor 2220 or software instructions. The above-mentioned processor 2220 may also be a general processor, a Digital Signal Processing (DSP), an Application-Specific Integrated Circuit (ASIC), a Field Programmable Gate Array (FPGA), or any other programmable logic device, discrete gates or transistor logic devices, discrete hardware components, etc. The disclosed methods, steps and logic diagrams in the embodiments of the present disclosure may be realized or executed. The general processor may be a microprocessor or any conventional processor, etc. The steps of the method disclosed in the embodiments of the present disclosure may be directly implemented by a hardware decoder processor, or may be accomplished by the combination of hardware and software modules in the decoder processor. The software modules may be located in a random-access memory, a flash memory, read-only memory, a programmable read-only memory, an electrically erasable programmable memory, registers, and other mature storage medium in the field. The storage medium is located in the memory 2210. The processor 2220 reads the information in the memory 2210 and performs the functions required by the controller of the embodiments of the present disclosure in combination with the hardware, or executes the control method for material handling equipment of the embodiments of the present disclosure.

The communication interface 2230 may adopt a device such as a transceiver to enable communication between the controller 2200 and other devices or communication networks. For example, sensor data may be obtained through the communication interface 2230.

The bus 2240 may include pathways for transmitting information between the controller 2200 with other devices (such as the memory 2210, the processor 2220, and the communication interface 2230).

It should be noted that although the controller 2200 as shown in FIG. 22 merely depicts the memory, the processor and the communication interface, in the actual implementation process, those skilled in the field should understand that the controller 2200 may further include other components necessary for its normal operation. Meanwhile, according to specific requirements, those skilled in the field should understand that the controller 2200 may further include hardware components that implement other additional functions. Furthermore, those skilled in the art should understand that the controller 2200 may merely include the components necessary to implement the embodiments of the present disclosure, without necessarily to include all the components shown in FIG. 22.

In addition to the above-mentioned methods, devices and equipment, the embodiments of the present disclosure may further include a computer program product including computer program instructions. When the computer program instructions are executed by the processor, each step of the control method for material handling equipment according to each embodiment of the present disclosure is realized.

The computer program product may be written in any combination of one or more programming languages for executing program code of the operations of the embodiments of the present disclosure. The programming languages include object-oriented programming languages such as Java, C++, etc., as well as conventional step-based programming languages such as "C" language or similar programming languages. The program code may be fully executed on a computing device of a user, partially on a device of the user, executed as an independent software package, partially on the computing device of the user and partially on a remote computing device, or fully executed on a remote computing device or server.

Furthermore, the embodiments of the present disclosure may also be a computer-readable storage medium storing computer program instructions. When the computer program instructions are executed by the processor, each step of the control method for material handling equipment according to each embodiment of the present disclosure is implemented.

The computer-readable storage medium may be any combination of one or more types of readable medium. The readable medium may be a readable signal medium or a readable storage medium. Readable storage medium may include, but is not limited to, electrical, magnetic, optical, electromagnetic, infrared, or semiconductor systems, devices or components, or any combination of the above. More specific examples (non-exhaustive list) of the read storage medium include: electrical connections with one or more wires, portable disks, hard disks, Random Access Memory (RAM), Read-Only Memory (ROM), Erasable Programmable Read-Only Memory (EPROM or flash memory), optical fibers, portable Compact Disc Read-Only Memory (CD-ROM), optical storage devices, magnetic storage devices, or any appropriate combination of the above.

It is apparent to those skilled in the art that, by combining the various units and algorithmic steps described in the embodiments disclosed in the document, the described functionalities may be implemented using electronic hardware, or a combination of computer software and electronic hardware. Whether these functions are implemented in the form of hardware or software is determined by specific applications and design constraint conditions of the technical solutions. Professional technicians may adopt different methods for each specific application to achieve the described functions, but such implementations should not be regarded as exceeding the scope of the present disclosure.

Those skilled in the art may clearly understand that, for case and brevity of description, the specific working processes of the above-mentioned system, device and unit may be referred to the corresponding processes in the method of the above-mentioned embodiments. The same features are not repeated herein.

In the several embodiments provided in the present disclosure, it should be understood that the disclosed system, device and method can be implemented in other ways as well. For example, the above-mentioned device embodiments are merely schematic. For example, the division of the above-mentioned unit is merely a logical function division. In actual implementation, there can be alternative ways of division. For example, multiple units or components can be combined or integrated into another system, or some features can be disregarded or not implemented. It should also be noted that any coupling, direct coupling, or communication connection shown or discussed may, in practice, be implemented as indirect coupling or communication connection via one or more interfaces, devices, or units, and may take electrical, mechanical, or any other suitable form.

The unit described as a separate component may be physically separated or not, and the components displayed as units may be physical units or not. That is, they may be located in one place or distributed across multiple network units. The specific units may be selected partially or entirely based on actual requirements to achieve the purpose of the scheme of the embodiments.

Furthermore, in each embodiment of the present disclosure, each functional unit may be integrated into a similar region segmentation unit, or exist physically separately in each unit, or two or more units can be integrated into one unit.

If the above-mentioned function is realized in the form of a software functional unit and is sold or used as an independent product, it may be stored in a computer-readable storage medium. Based on the understanding, the technical solution of the present embodiment, in essence or in terms of its contribution to the prior art, or certain parts of the technical solution can be embodied in the form of a software product. The computer software product is stored in a storage medium, including several instructions for enabling a controller (may be a personal computer, server, or network device, etc.) to execute all or part of the steps of the methods described in each of the embodiments of the present disclosure. The above-mentioned storage medium include: USB flash drives, portable hard drives, read-only memory, random access memory, magnetic disks or optical discs, and other various media capable of storing program codes.

As mentioned above, these are merely specific embodiments of the present disclosure, but the scope of protection of the present disclosure is not limited to this. Any person skilled in the field of this technology can easily conceive of variations or substitutions within the scope of the disclosed technology in the present disclosure, and all such variations or substitutions should be covered by the protection scope of the present disclosure. Therefore, the scope of protection of the present disclosure should be determined by the protection scope of the claims.

What is claimed is:

1. A material handling equipment, comprising: a controller, wherein the controller is configured to execute program instructions to implement the following steps:

acquiring a point cloud of a compartment of a target vehicle;

determining, based on the point cloud of the compartment, a first plane located by a left-side wall of the compartment and a second plane located by a right-side wall of the compartment;

determining, based on a position of an object inside the compartment, a third plane, wherein the third plane is perpendicular to the first plane and the second plane;

determining, based on a position of the third plane, a pose of a storage location or a pose of a cargo; and controlling, based on the pose of the storage location, the material handling equipment to load the target vehicle, or controlling, based on the pose of the cargo, the material handling equipment to unload the target vehicle;

wherein the determining, based on the position of the third plane, the pose of the storage location, comprises:

determining, based on the position of the third plane, a second region, wherein the second region is located between the third plane and a rear end of the target vehicle; and determining, based on the second region, the pose of the storage location;

wherein the determining, based on the position of the third plane, the second region, comprises:

determining, based on dimensions of a cargo to be loaded and a loading spacing, the second region bounded by the third plane, the first plane and the second plane.

2. The material handling equipment according to claim 1, further comprising: a vehicle-state detection device configured to detect a pitch angle of the material handling equipment;

wherein the controller is further configured to execute program instructions to implement the following steps:

acquiring the pitch angle of the material handling equipment; and calibrating, based on the pitch angle of the material handling equipment, the point cloud of the compartment.

3. The material handling equipment according to claim 2, wherein the calibrating, based on the pitch angle of the material handling equipment, the point cloud of the compartment, comprises:

determining whether the pitch angle of the material handling equipment exceeds a threshold; and rotating, based on the pitch angle of the material handling equipment, the point cloud of the compartment when the pitch angle of the material handling equipment exceeds the threshold.

4. The material handling equipment according to claim 1, wherein the controller is further configured to execute program instructions to implement the following steps:

determining whether the point cloud of the compartment at a current moment is complete; and replacing the point cloud of the compartment at the current moment with a previous complete point cloud of the compartment when the point cloud of the compartment at the current moment is not complete.

5. The material handling equipment according to claim 1, wherein the determining, based on the position of the object inside the compartment, the third plane, comprises:

determining, based on the position of the object inside the compartment, a boundary of the object inside the compartment; and generating, based on the boundary of the object, the third plane.

6. The material handling equipment according to claim 5, wherein the generating, based on the boundary of the object, the third plane, comprises:

determining a part, closest to a rear end of the target vehicle, of the boundary of the object when the boundary of the object is not a straight line; and constructing, based on a position of the part, closest to the rear end of the target vehicle, of the boundary of the object, a plane perpendicular to the first plane and the second plane to obtain the third plane.

7. The material handling equipment according to claim 1, wherein the determining, based on the position of the third plane, the pose of the cargo, comprises:

determining, based on the position of the third plane, a first region and acquiring a point cloud of the cargo within the first region, wherein the first region is located between the third plane and a front end of the target vehicle; and determining, based on the point cloud of the cargo within the first region, the pose of the cargo.

8. The material handling equipment according to claim 7, wherein the material handling equipment further comprises an attachment, the attachment is provided with a plurality of stations, configured to transport a plurality of pallets of the cargo; the first region is provided with the plurality of pallets of the cargo;

the determining, based on the point cloud of the cargo within the first region, the pose of the cargo comprises:

determining, based on the point cloud of the cargo within the first region, respective poses of the plurality of pallets of the cargo;

determining, based on the respective poses of the plurality of pallets of the cargo, at least two pallets of the cargo meeting a target condition, wherein the target condition comprises that the material handling equipment is capable of transporting the at least two pallets of the cargo simultaneously; and determining, based on the respective poses of the at least two pallets of the cargo, the pose of the cargo.

9. The material handling equipment according to claim 8, wherein the determining, based on the respective poses of the at least two pallets of the cargo, the pose of the cargo, comprises:

determining an average of the respective poses of the at least two pallets of cargo to be the pose of the cargo.

10. The material handling equipment according to claim 8, wherein the determining, based on the respective poses of the plurality of pallets of the cargo, the at least two pallets of the cargo meeting the target condition, comprises:

determining, based on the respective poses of the plurality of pallets of the cargo, an angle difference, a front-to-back difference, a height difference, and a spacing between each adjacent pair of the plurality of pallets of the cargo; and determining adjacent pairs of pallets of the cargo with the angle difference, the front-to-back difference, the height difference, and the spacing falling within a specified threshold range to be the at least two pallets of the cargo meeting the target condition.

11. The material handling equipment according to claim 7, wherein the determining, based on the position of the third plane, the first region and acquiring the point cloud of the cargo within the first region, comprises:

determining the first region, bounded by the third plane, the first plane and the second plane; and performing cargo detection on the point cloud within the first region, to obtain the point cloud of the cargo within the first region.

12. The material handling equipment according to claim 7, wherein the determining, based on the point cloud of the cargo within the first region, the pose of the cargo, comprises:

performing layered slicing on the point cloud of the cargo within the first region along a first direction, to obtain a sliced point-cloud set, wherein the sliced point-cloud set comprises point clouds of a plurality of slices;

clustering point clouds in the sliced point-cloud set, to determine a set of fork pockets and block faces;

matching the set of the fork pockets and the block faces with a set of target beam information to obtain a target pallet; and calculating, based on a point cloud of the target pallet, a pose of the target pallet to obtain the pose of the cargo.

13. The material handling equipment according to claim 12, wherein the clustering the point clouds in the sliced point-cloud set, to determine the set of fork pockets and block faces, comprises:

clustering the point clouds of the plurality of slices respectively, to select a plurality of target slices from the plurality of slices;

sorting point clouds of the plurality of target slices along a second direction;

determining attribute information of each block face in the point clouds of the plurality of target slices;

determining, based on the attribute information of each block face in the point clouds of the plurality of target slices, attribute information of each fork pocket; and generating, based on the attribute information of each block face and the attribute information of each fork pocket, the set of fork pockets and block faces.

14. The material handling equipment according to claim 12, wherein the calculating, based on the point cloud of the target pallet, the pose of the target pallet to obtain the pose of the cargo comprises:

extracting, based on the point cloud of the target pallet, a point cloud of a block face of the target pallet; and determining, based on the point cloud of the block face of the target pallet, the pose of the target pallet.

15. The material handling equipment according to claim 1, wherein the determining, based on the second region, the pose of the storage location, comprises:

acquiring, based on a direction parallel to the first plane and the second plane, and the second region, the pose of the storage location.

16. The material handling equipment according to claim 1, wherein the determining, based on the point cloud of the compartment, the first plane located by the left-side wall of the compartment and the second plane located by the right-side wall of the compartment, comprises:

extracting a point cloud of the left-side wall of the compartment and a point cloud of the right-side wall of the compartment from the point cloud of the compartment; and performing plane fitting on the point cloud of the left-side wall of the compartment and the point cloud of the right-side wall of the compartment respectively, to obtain the first plane and the second plane.

17. A control method for material handling equipment, comprising:

acquiring a point cloud of a compartment of a target vehicle;

determining, based on the point cloud of the compartment, a first plane located by a left-side wall of the compartment and a second plane located by a right-side wall of the compartment;

determining, based on a position of an object inside the compartment, a third plane, wherein the third plane is perpendicular to the first plane and the second plane;

determining, based on a position of the third plane, a pose of a storage location or a pose of a cargo; and controlling, based on the pose of the storage location, the material handling equipment to load the target vehicle, or controlling, based on the pose of the cargo, the material handling equipment to unload the target vehicle, wherein the determining, based on the position of the third plane, the pose of the storage location, comprises:

determining, based on the position of the third plane, a second region, wherein the second region is located between the third plane and a rear end of the target vehicle; and determining, based on the second region, the pose of the storage location;

wherein the determining, based on the position of the third plane, the second region, comprises:

determining, based on dimensions of a cargo to be loaded and a loading spacing, the second region bounded by the third plane, the first plane and the second plane.

18. A controller, configured to execute program instructions to implement the following steps:

acquiring a point cloud of a compartment of a target vehicle;

determining, based on the point cloud of the compartment, a first plane located by a left-side wall of the compartment and a second plane located by a right-side wall of the compartment;

determining, based on a position of an object inside the compartment, a third plane, wherein the third plane is perpendicular to the first plane and the second plane;

determining, based on a position of the third plane, a pose of a storage location or a pose of a cargo; and controlling, based on the pose of the storage location, the material handling equipment to load the target vehicle, or controlling, based on the pose of the cargo, the material handling equipment to unload the target vehicle;

wherein the determining, based on the position of the third plane, the pose of the storage location, comprises:

determining, based on the position of the third plane, a second region, wherein the second region is located between the third plane and a rear end of the target vehicle; and determining, based on the second region, the pose of the storage location;

wherein the determining, based on the position of the third plane, the second region, comprises:

determining, based on dimensions of a cargo to be loaded and a loading spacing, the second region bounded by the third plane, the first plane and the second plane.

* * * * *